United States Patent
Lemarchand

(10) Patent No.: US 10,551,195 B2
(45) Date of Patent: Feb. 4, 2020

(54) PORTABLE DEVICE WITH IMPROVED SENSOR POSITION CHANGE DETECTION

(71) Applicant: MOVEA, Grenoble (FR)

(72) Inventor: Antoine Lemarchand, Grenoble (FR)

(73) Assignee: Movea, Grenoble (FR)

( * ) Notice: Subject to any disclaimer, the term of this patent is extended or adjusted under 35 U.S.C. 154(b) by 11 days.

(21) Appl. No.: 15/242,236

(22) Filed: Aug. 19, 2016

(65) Prior Publication Data
US 2018/0051989 A1 Feb. 22, 2018

(51) Int. Cl.
*G01C 21/16* (2006.01)
*G01C 21/20* (2006.01)

(52) U.S. Cl.
CPC .......... *G01C 21/16* (2013.01); *G01C 21/206* (2013.01)

(58) Field of Classification Search
None
See application file for complete search history.

(56) References Cited

U.S. PATENT DOCUMENTS

| 2014/0152507 A1* | 6/2014 | McAllister | G06K 7/10376 342/126 |
| 2015/0316576 A1* | 11/2015 | Pakzad | G01P 13/00 702/141 |

\* cited by examiner

*Primary Examiner* — David M. Gray
*Assistant Examiner* — Geoffrey T Evans
(74) *Attorney, Agent, or Firm* — Bay Area Technology Law Group PC

(57) ABSTRACT

The invention relates to a portable device with improved sensor position change detection. It aims at detecting a change of position of a mobile device relative to a user and, based on this change of position, a change of orientation of the mobile device relative to the user. This allows, when the orientation of the mobile device suddenly changes relative to a user, to keep track of this change. This is particularly useful for position tracking techniques such as Pedestrian Dead Recognition (PDR), which rely on an iterative determination of the orientation of a mobile device relative to the user, and may be affected by a sudden and important change of this relative orientation.

23 Claims, 12 Drawing Sheets

| delta | Pos1 | Pos2 | Pos3 | Ukn |
|---|---|---|---|---|
| Pos1 | 0 | 90 | -90 | ? |
| Pos2 | -90 | 0 | -180 | ? |
| Pos3 | 90 | 180 | 0 | ? |
| Ukn | ? | ? | ? | ? |

FIG.5

PORTABLE DEVICE WITH IMPROVED SENSOR POSITION CHANGE DETECTION

FIELD OF THE INVENTION

The present invention relates to the field of portable devices. More specifically, it relates to portable devices which are able to track changes of the relative position of the portable device to the user.

BACKGROUND PRIOR ART

Pedestrian Dead Reckoning (PDR) is a method of calculating a position of a user by the computation of successive positions of the user. The successive positions are calculated using the previous position, and an estimation of the direction and speed of the movement of the user. PDR can typically be performed by a portable device carried or worn by the user, such as e.g. a smartphone. The motion sensors of the portable device thus provide an estimation of the direction and speed of the movement of the user. Compared to other methods of estimating the position of the user, PDR has the advantage of having the ability to be performed in any environment, and requiring a limited amount of resources on the portable device. On the contrary, other methods such as GPS navigation are subject to the reception of external signals which are not always available, and the reception of such signals requires a large amount of resources. There, for pedestrian indoor navigation, PDR is a solution that may be used.

However, the PDR method is subject to addition of errors. Indeed, errors of estimation of the speed or orientation of the movement of the user may lead, at each iteration of calculation of a position, to an error in the difference between the current position and the previous one. The addition of successive errors may generate, after a number of successive iterations, an increased error in the position of the user.

Methods such as Fused Location Provider (FLP) alleviate this drawback. FLP consist in determining the location of the user using a combination of different techniques and methods, such as, for example, PDR, absolute position inputs (GPS, Wi-Fi, Bluetooth signals . . . ) and/or maps. For example, and absolute input such as a GPS input may be used from time to time to reset the position of the user to an absolute position in order to avoid the addition of errors on the position over a too long period, while saving resources by limiting access to GPS signals. It is also possible to use absolute position methods as soon as absolute position inputs are available, and PDR otherwise.

Co-pending, commonly owned U.S. patent application Ser. No. 14/537,503 filed Nov. 10, 2014, which is hereby incorporated herein by reference in its entirety, discloses a trajectory tracking system, which is configured to process motion signals to perform PDR, and fuse the location obtained by PDR with absolute input data such as GPS.

The orientation of signals which are sensed by motion sensors depend on the relative orientation and position of the sensor compared to the body of the user. The determination of the relative position of the portable device to the body of the user thus permits to efficiently transform the orientation of the motion sensed by the portable device into orientation of the user.

Co-pending, commonly owned U.S. patent application Ser. No. 15/105,757 filed Jun. 17, 2016, which is hereby incorporated herein by reference in its entirety, discloses a method for continuously computing a misalignment of the orientation of a user and a portable device worn by the user. This misalignment information can be used by a PDR algorithm. However, it is difficult to separate motion that are caused by a change of orientation of the portable device relative to the user, and the motion of the user himself.

SUMMARY OF THE INVENTION

The invention discloses a mobile device comprising: a memory storing two or more reference positions of the mobile device relative to a user, and one or more reference changes of orientation of the mobile device relative to the user in between the two or more reference positions; one or more sensors comprising one or more motion sensors; a processor comprising a processing logic configured to: receive signals from said one or more sensors comprising motion signals from said one or more motion sensors; identify, based on said signals, a first reference position of the mobile device relative to the user; detect, based on said motion signals, a rotation of the mobile device; identify, based on said signals, a second reference positioning of the mobile device relative to the user; determine, based at least on said first reference position and said second reference position, a change of orientation of the mobile device relative to the user during the rotation.

The invention further discloses a method for determining a change of orientation of a mobile device relative to a user, said method comprising: accessing a memory storing two or more reference positions of the mobile device relative to the user, and one or more reference changes of orientation of the mobile device relative to the user in between the two or more reference positions; receiving signals from said one or more sensors comprising motion signals from at least one motion sensor onboard the mobile device; detecting, based on said signals, a first reference position of the mobile device relative to the user; identifying, based on said signals, a first reference position of the mobile device relative to the user, detecting, based on said motion signals, a rotation of the mobile device; identifying, based on said signals, a second reference position of the mobile device relative to the user; determining, based at least on said first reference position and said second reference position, a change of orientation of the mobile device relative to the user during the rotation.

BRIEF DESCRIPTION OF THE DRAWINGS

The invention will be better understood and its various features and advantages will emerge from the following description of a number of exemplary embodiments and its appended figures in which:

FIG. 5 displays an example of reference changes of orientation of the mobile device in between reference positions;

DETAILED DESCRIPTION OF THE INVENTION

Figure 1:
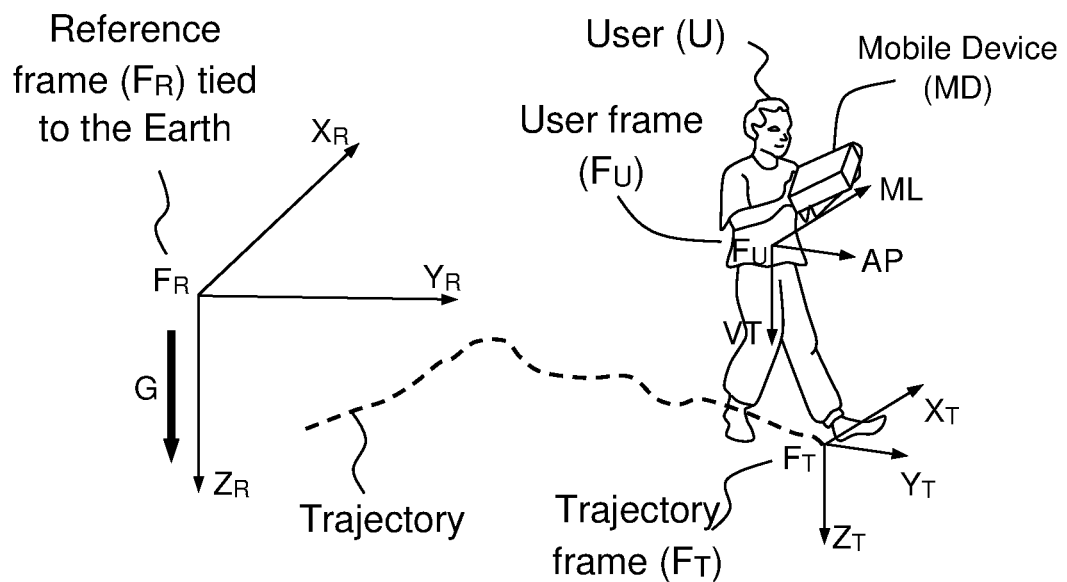
FIG. 1 displays a number of reference frames used for calculating the position of a user of a portable device using Pedestrian Dead Recognition.
Figure 1:
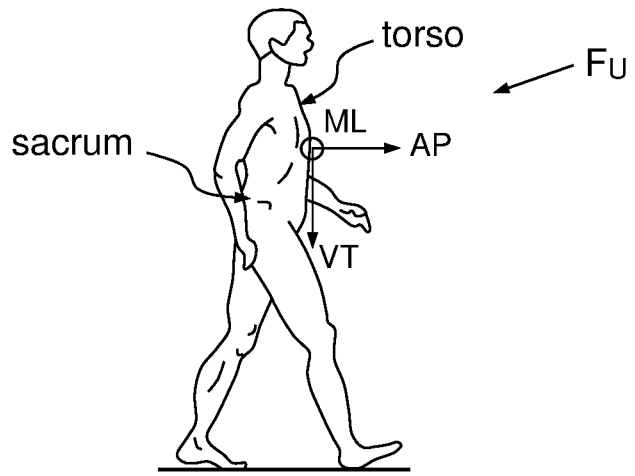
Figure 2A:
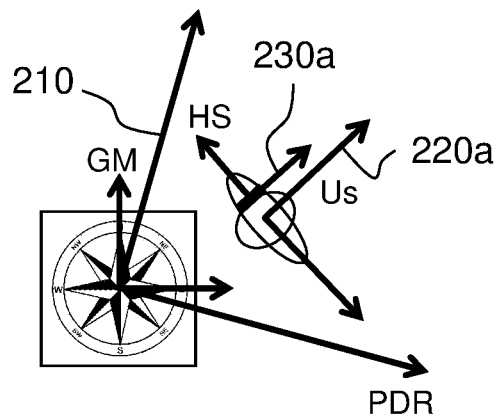
FIGS. 2a, 2b, 2c, 2d and 2e display different relations between frames used for calculating the position of a user of a portable device using Pedestrian Dead Recognition.
Figure 2B:
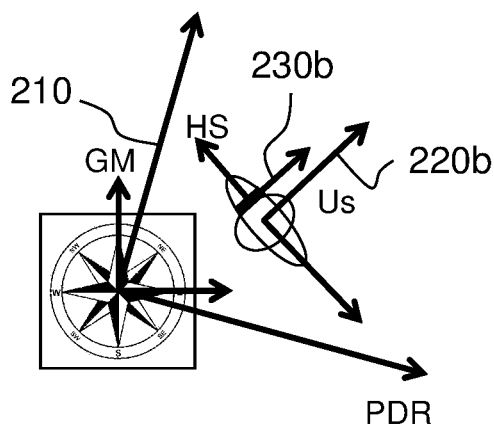
Figure 2C:
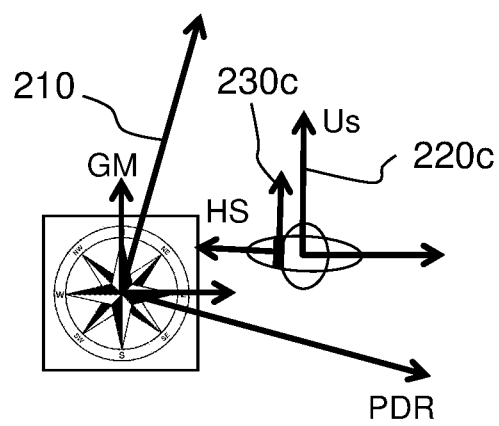
Figure 2D:
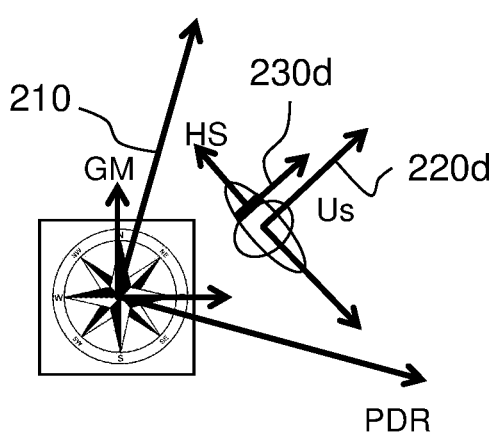
Figure 2E:
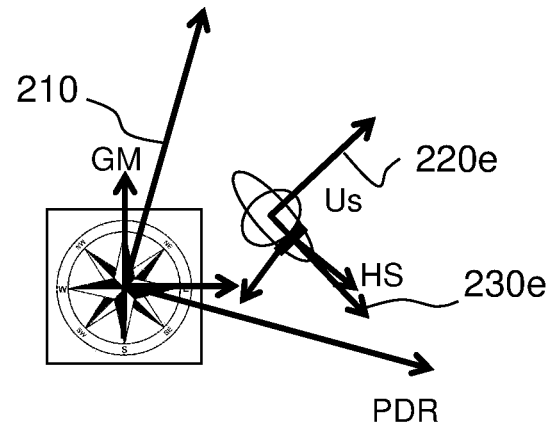

FIG. 1 displays a number of reference frames used for calculating the position of a user of a portable device using Pedestrian Dead Recognition.

A number of different methods, such as the method disclosed in co-pending, commonly owned U.S. patent application Ser. No. 15/105,757 filed Jun. 17, 2016, which is hereby incorporated herein by reference in its entirety, may be used to determine the direction of the trajectory followed by a user. The trajectory may be characterized by a trajectory frame at the current instant denoted $F_T$, which itself is in a reference frame (frame $F_R$, often the Terrestrial frame or the Earth's reference frame). In the example of FIG. 1, the user is a pedestrian. However, the same principle is applicable to other types of users, such as a biker, a driver, etc. . . . The desired direction information is provided by the orientation of the trajectory frame in the reference frame for the current instant, that is to say by giving a rotation transformation operator $Q_{RT}$ for rotating between the two frames. Using the successive operators $Q_{RT}$ over time, associated with giving the user's successive speeds over time, makes it possible for example to plot the user's trajectory. This trajectory estimation technique based on giving a heading and a speed is commonly called "Dead Reckoning" or "Deduced Reckoning", often denoted DR. We are concerned here with the problem of estimating the heading of the user at each instant, without being concerned with the speed.

The complexity of the problem posed stems from the fact that we have no direct measurement of the heading of the user in the reference frame $F_R$, but more indirectly we do have measurements arising from motion sensors for a mobile device MD carried by the user. Indeed, the position and the orientation of the mobile device MD with respect to the user are not known. Thus, even if it may be considered that the orientation of the mobile device MD with respect to the reference frame $F_R$ is known, or more probably or practically, can be obtained on the basis of the motion sensors present in the mobile device, it is not possible to determine the orientation of the user (and therefore of his trajectory) in the reference frame $F_R$.

It is considered that the user holds a mobile device MD comprising motion sensors and that he or she is moving by walking or running with the mobile device MD. The mobile device MD comprises for example, motion sensors such as e.g. accelerometers and/or magnetometers and/or gyrometers, which are commonly available with three measurement axes. Thus an accelerometer A directly provides the acceleration which can be represented by a vector with three components. The same goes for a magnetometer M, which directly provides the magnetic field, representable by a vector with three components. Likewise, a gyrometer G provides the rotation speeds in relation to its three axes, the rotation speed is also representable by a three-dimensional vector. These three sensors are commonly available and mobile telephones or smartphones, or touchpad tablets are now commonly equipped with them. The sensors provide their measurements in the frame of the sensor or frame of the mobile device MD.

A typical example of a mobile device is a mobile telephone or a tablet, or a laptop computer. It can also be any other object equipped with motion sensors, such as interactive glasses, or accessories carried or worn by the user. Such sensors are now commonly embedded in mobile telephones, tablets or computers. Interactive glasses can easily be equipped with such sensors. The electronic accessories carried or worn by a person are also commonly equipped with motion sensors, notably those which are intended for monitoring people's physical activity. Specialized radio terminals for isolated workers also form part of the devices in which such sensors may be embedded. The invention applies to any electronic device carried or worn by a person and equipped with at least one motion sensor. All the electronic devices cited are moreover provided with computation means, means of connecting and of communicating data to computing networks. The entire computation implementing the invention can be carried out aboard the electronic device, without needing any communication with a network.

In an exemplary scenario of trajectory recognition, the user holds a mobile telephone or smartphone comprising or being considered to be a mobile device MD, equipped with motion sensors. The objective consists in estimating the trajectory of the user with the aid solely of the motion sensors present aboard the mobile device MD or smartphone. Giving, at each instant, the velocity vector of the user in the reference frame makes it possible to apply the technique of Dead Reckoning. The velocity vector can be decomposed into a modulus (the speed of displacement of the user in the reference frame) and the datum regarding the orientation in the reference frame $F_R$. We are principally concerned with the determination of this orientation information which is very complex, insofar as the user is free to carry his mobile telephone in various ways and that thus the orientation of the mobile telephone does not determine the heading of the trajectory. In the majority of industrially relevant cases, the user moves on horizontal planes with respect to a terrestrial frame. In this type of scenario, providing the orientation of the velocity vector of the user in the reference frame $F_R$ is then limited to the provision of a single angle of heading of his trajectory on the horizontal displacement plane.

The motion sensors principally considered (A, G and M) provide three-dimensional measurement vectors. The sensors are rigidly tied to the mobile device MD. It is therefore possible to consider that the sensors thus deliver their vector measurements in one and the same frame, tied to this mobile device MD. The person skilled in the art is aware of the procedures which make it possible to correct, if necessary, possible misalignments between the axes of the sensors. For small misalignments, the invention can nevertheless be applied.

As was mentioned previously, techniques are known for providing the orientation of the mobile device MD in the reference frame $F_R$, when this reference frame is defined as tied to the Earth. It should indeed for example be noted that the sensors A, G, M, conventionally present in smartphones make it possible to construct an attitude platform or "Inertial Measurement Unit" (acronym IMU) which, for example, through a sensor data fusion technique, provides the orientation of the mobile device frame $F_D$ with respect to a reference frame tied to the Earth, that is to say the rotation transformation operator $Q_{DR}$. Numerous combinations are possible between the sensors A, G, M so as to arrive at a satisfactory estimation of $Q_{DR}$. If the mobile device is provided with high quality sensors, for example a low-drift gyrometer with very good calibration, it is possible to estimate at each instant this orientation with respect to a Terrestrial frame solely on the basis of the gyrometer over a horizon of several tens of minutes. Note, however, that the problem of not knowing the heading of the user remains, since the orientation, even accurate, of the mobile device does not in any way determine the heading of the trajectory.

To complete the conventions regarding frames and notation, it is considered that the user is associated or provided with a user frame $F_U$. Any other frame is possible, and does not restrict the generality of the present description. For example, the user is provided with a user frame denoted $F_U$ defined by a first Antero-Posterior axis AP, a second Medio-Lateral axis ML and a third Vertical axis VT. The three-axis system (ML, AP, VT) forms the user frame $F_U$. During a "normal" walking or running activity, it may be considered that the Antero-Posterior axis AP is directed in the sense of the trajectory. Thus, for example, the fact of knowing the orientation of the trajectory frame $F_T$ in the reference frame $F_R$ is equivalent to knowing the orientation of the user frame $F_U$ in the reference frame $F_R$, since naturally, the user has a trajectory directed along the Antero-Posterior axis AP. The two frames: user frame $F_U$ and trajectory frame $F_T$ are consequently equivalent, optionally to within a constant rotation operation. This rotation transformation operator is denoted $Q_{PT}$. The rotation transformation operator $Q_{PT}$ is constant and known. For example, according to the notation and conventions of FIG. 1, it is equal to the identity: (AP, ML, VT)=($X_T$, $Y_T$, $Z_T$).

FIGS. 2a, 2b, 2c, 2d, and 2e display different relations between frames used for calculating the position of a user of a portable device using Pedestrian Dead Recognition (PDR).

During the whole PDR process, the reference frame $F_R$ 210, in which the sensors measurements are obtained remained fixed, for example tied to the Earth.

The user frame $F_U$ is tied to the user, and successively affected by different orientations relative to the reference frame, as the user moves and turns on itself. The successive orientations of the user frame are represented under the references 220a, 220b, 220c, 220d, 220e.

The mobile device frame $F_D$ is tied to the mobile device, and is successively affected by different orientations relative to the reference frame $F_R$, as the user moves, turns on itself, and puts the mobile device in different positions. The successive orientations of the mobile device frame $F_D$ are represented under the references 230a, 230b, 230c, 230d, 230e. It is possible to obtain, based on sensor information, the relative orientation or derivative thereof of the mobile device frame $F_D$ and the reference frame $F_R$. When the mobile device frame $F_D$ remains fixed in the user frame $F_U$, this allows obtaining the relative orientation of the user frame $F_U$ in the reference frame $F_R$. This is for example the case in FIGS. 2a, 2b, 2c and 2d. On the contrary, in FIG. 2e, the user moved the mobile device and thus the sensors, thus modifying the relative orientation of the mobile device frame $F_D$ in the user frame $F_U$. In this case, it is not possible anymore to obtain directly the orientation of the user in the reference frame. Moreover, it is not possible to discriminate directly, using information from motion sensors, signals representative of a rotation of the user, or signals representative of a rotation of the mobile device relative to the user.

However, the applicant noted that, in the most common situations, the mobile device is held in a limited number of positions relative to the user. For example, when the mobile device is a mobile phone, the mobile phone is often placed in front of the left ear of the user, for example in 230a, 230b, 230c and 230d, or in front of the right ear of the user, such as in 230e, when the user is using the phone to call. These positions, as other common positions such as the left pocket or the right pocket of the user, can be detected based on a number of information from different sensors, such as the orientation of the mobile device relative to the ground, the detection of a sound in a microphone, the detection of a proximity of the skin of the user, etc. . . . As will be explained below, this additional information provides, in the invention, useful information for making the difference between rotations of the user with the device in a fixed position, and rotations of the mobile device with respect to the user, thus providing significant improvement to PDR techniques.

Figure 3A:
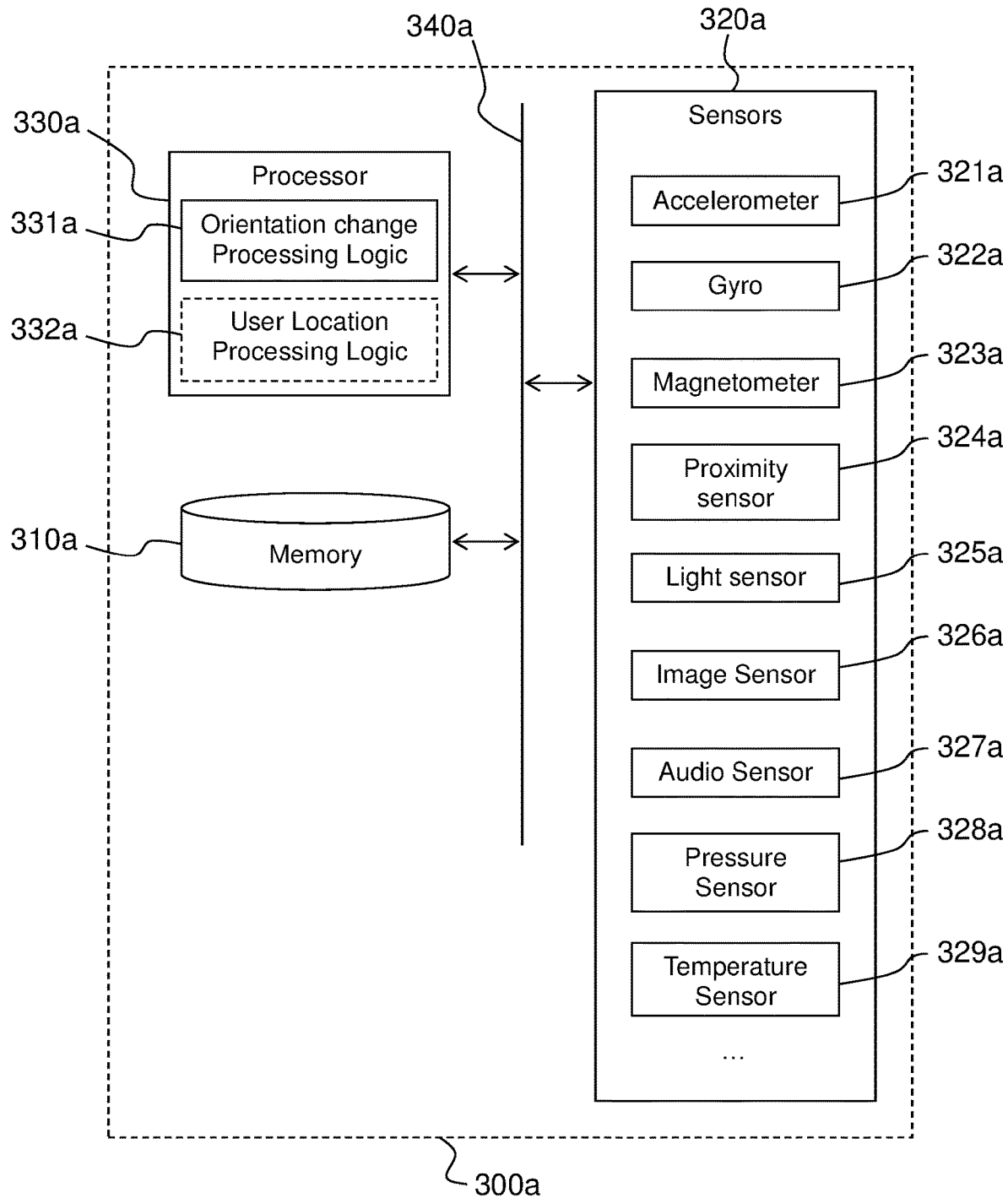
FIGS. 3a and 3b display two examples of hardware architectures in two different embodiments of the invention.
Figure 3B:
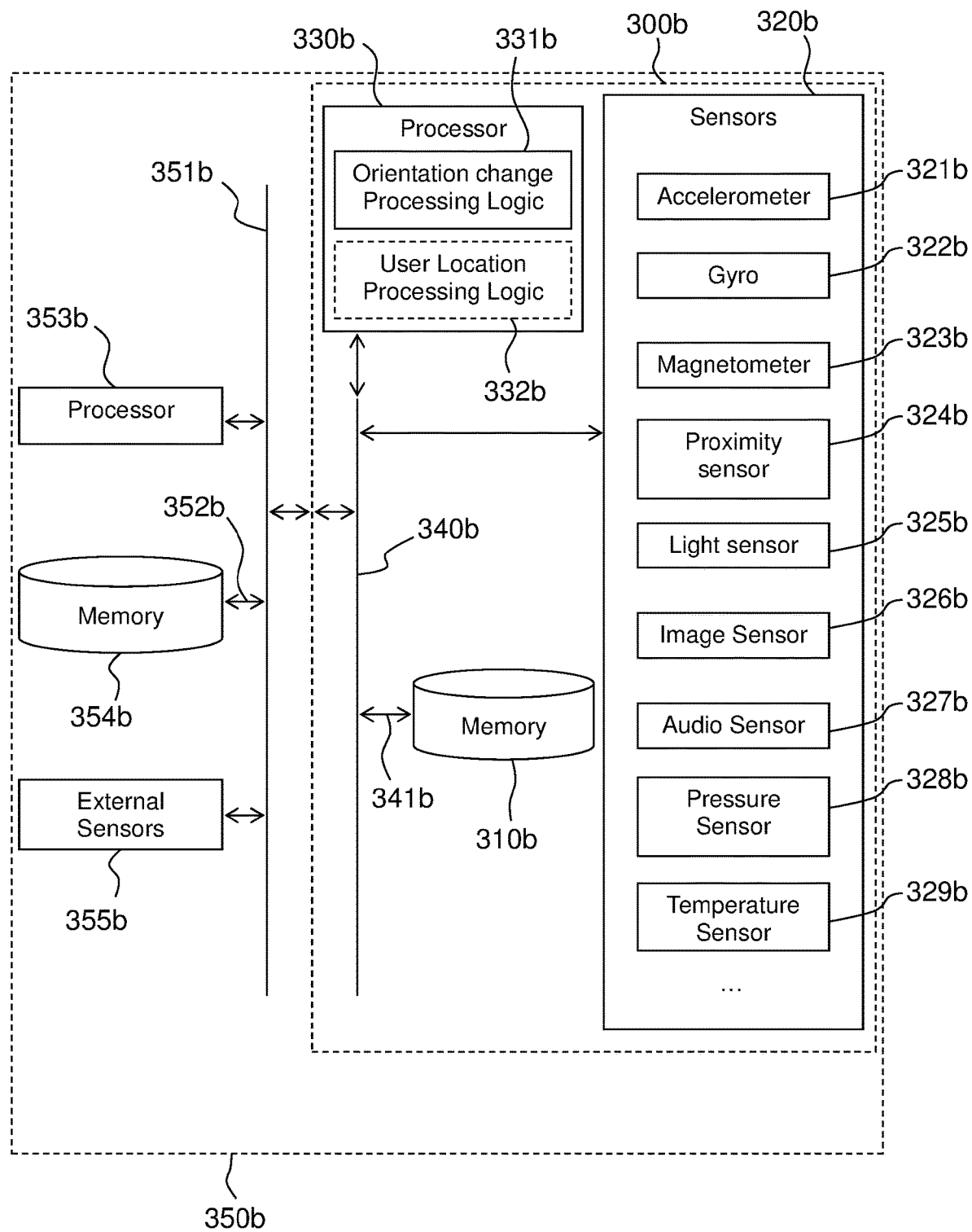

FIGS. 3a and 3b display two examples of hardware architectures in two different embodiments of the invention.

FIG. 3a displays an example of hardware architecture of a mobile device in an embodiment of the invention.

The mobile device 300a may for example be the mobile device MD of FIG. 1. The mobile device 300a may comprise a mobile phone (e.g., a cellular phone, a phone running on a local network, or any other telephone handset), wired telephone (e.g., a phone attached by a wire and/or optical tether), personal digital assistant (PDA), pedometer, personal activity and/or health monitoring device, video game player, video game controller, navigation device, mobile internet device (MID), personal navigation device (PND), digital still camera, digital video camera, binoculars, telephoto lens, portable music, video, or media player, remote control, or other handheld device, headset, eyeglasses, or a combination of one or more of these devices.

In some embodiments, the mobile device 300a may be a self-contained device that comprises its own display and/or other user output devices in addition to the user input devices as described below. However, in other embodiments, the mobile device 300a may function in conjunction with another portable device or a non-portable device such as a desktop computer, electronic tabletop device, server computer, smart phone, etc., which can communicate with the mobile device 300a, e.g., via network connections. The device mobile 300a may, for example, be capable of communicating via a wired connection using any type of wire-based communication protocol (e.g., serial transmissions, parallel transmissions, packet-based data communications), wireless connection (e.g., electromagnetic radiation, infrared radiation or other wireless technology), or a combination of one or more wired connections and one or more wireless connections.

The mobile device comprises a memory 310a storing two or more reference positions of the mobile device relative to a user, and one or more reference changes of orientation of the mobile device relative to the user in between the two or more reference positions. The positions that may be stored will be discussed in detail with reference to FIG. 4, and the reference changes of orientation with reference to FIG. 5.

The mobile device 300a further comprises one or more sensors 320a comprising one or more motion sensors 321a, 322a, 323a. The mobile device may comprise motion sensors such as an accelerometer 321a, a gyrometer (or gyroscope) 322a, a magnetometer 323a. In a number of embodiments of the invention, the mobile device 300a comprises two or more sensors comprising one or more motion sensors, for example one or more of a proximity sensor 324a, a light sensor 325a, an image sensor 326a, an audio sensor 327a, a pressure sensor 328a, and a temperature sensor 329a.

Though not shown, the sensors 320a may comprise any of a variety of sensors, for example, moisture sensor, biometric sensor, etc. All or some of the internal sensors 320a may, for example, be implemented as MEMS-based motion sensors, including inertial sensors such as a gyroscope or accelerometer, or an electromagnetic sensor such as a Hall effect or Lorentz field magnetometer. As desired, one or more of the sensors 320a may be configured to provide raw data output measured along three orthogonal axes or any equivalent structure. The memory 310a may store algorithms, routines or other instructions for processing data output by one or more of the sensors 320a, including a trajectory estimation module and sensor fusion module.

The mobile device 300a further comprises a processor 300a. The processor 300a may be one or more microprocessors, central processing units (CPUs), microcontrollers or other processors, which run software programs for the mobile device 300a and/or for other applications related to the functionality of the mobile device 300a. For example, different software application programs such as menu navigation software, games, camera function control, navigation software, and telephone, or a wide variety of other software and functional interfaces, can be provided. In some embodiments, multiple different applications can be provided on a single mobile device 300a, and in some of those embodiments, multiple applications can run simultaneously on the mobile device 300a. Multiple layers of software can, for example, be provided on a computer readable medium such as electronic memory or other storage medium such as hard disk, optical disk, flash drive, etc., for use with the processor 330a. For example, an operating system layer can be provided for the mobile device 300a to control and manage system resources in real time, enable functions of application software and other layers, and interface application programs with other software and functions of the device 300a. In various example embodiments, one or more motion algorithm layers may provide motion algorithms for lower-level processing of raw sensor data provided from internal or external sensors. Further, a sensor device driver layer may provide a software interface to the hardware sensors of the device 300a. Some or all of these layers can be provided in the memory 310a for access by the processor 300a, or in any other suitable architecture (e.g., including distributed architectures).

The processor 330a comprises a processing logic 331a configured to determine a change of orientation of the mobile device relative to the user during a rotation. According to various embodiments of the invention, the processing logic 331a may be the processor 330a operating in accordance with software instructions, a hardware configuration of the processor 330a, or a combination thereof. It should be understood that any or all of the functions discussed herein may be implemented in a pure hardware implementation and/or by a processor operating in accordance with software instructions. It should also be understood that any or all software instructions may be stored in a non-transitory computer-readable medium.

In a number of embodiments of the invention, the processing logic 331a is configured to:
- receive signals from said one or more sensors comprising motion signals from said one or more motion sensors;
- identify, based on said signals, a first reference position of the mobile device relative to the user;
- detect, based on said motion signals, a rotation of the mobile device;
- identify, based on said signals, a second reference position of the mobile device relative to the user;
- determine, based at least on said first reference positions and said second reference position, a change of orientation of the mobile device relative to the user during the rotation.

The operation and configuration of the processing logic 331a is further discussed with reference to FIGS. 6a and 6b.

Motion signals may comprise raw signals to be processed by the processor, as well as pre-processed signals. For example, motion signals may comprise an orientation of the mobile device, based on signals from an accelerometer 321a, a gyroscope 322a, or a fusion of signals from the accelerometer 321a and the gyro 322a. Many different motion signals may be received, in different embodiments of the invention. In some embodiments of the invention motion signals may for example comprise signals from a magnetometer 323a, changes of orientation of the mobile device 300a in a reference frame, or direct measurement of components of an acceleration vector from the accelerometer.

Thus the processing logic 331a is able to detect rotations of the mobile device relative to the user, and determine changes of orientation of the mobile device relative to the user during the rotation. In a number of embodiments of the invention, the processing logic 331a is configured to determine a rotation of the mobile device frame $F_D$ relative to the user frame $F_U$.

In a number of embodiments of the invention, the processor 330a further comprises a user location processing logic 332a to calculate a location of the user based on a fusion of data from different sensors. For example, the user location processing logic 332a may be a user location processing logic based on a Pedestrian Dead Recognition algorithm. Co-pending, commonly owned U.S. patent application Ser. No. 14/537,503 filed Nov. 10, 2014, which is hereby incorporated herein by reference in its entirety, provides an example of such user location processing logic. In a number of embodiments of the invention, the processor 330a is configured to output the change of orientation to said user location processing logic 332a. This allows the user location processing logic 332a having an input relative to a sudden changes of orientation of the mobile device relative to the user, and thus improve trajectory estimation, by removing a number of misalignment issues.

In a number of embodiments of the invention, the mobile device 300a further comprises a communication bus or interface 340a. This interface allows a communication between the processor 330a, memory 310a, and sensors 320a. It allows for example the processor 330a receiving signals from sensors 320a, or loading data from memory 310a. The communication interface 340a may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, or other equivalent.

FIG. 3b displays an example of hardware architecture of a sensor processing unit in an embodiment of the invention.

The Sensor Processing Unit (SPU) 300b comprises one or more sensors, with additional computing capabilities, in order to provide an all-in-one solution, which may be directly integrated in a mobile device 350b, with sensors and processing capabilities to detect a rotation of the mobile device 350b determine a change of orientation of the mobile device 350b relative to a user during the rotation. In cases wherein the SPU comprises one or more motion sensors, it is called a Motion Processing Unit (MPU). The sensor(s), processor, and memory may be integrated in a single chip or package.

The sensor processing unit 300b comprises an access to a memory storing two or more reference positions of the mobile device relative to a user, and one or more reference changes of orientation of the mobile device relative to the user in between the two or more reference positions. According to various embodiments of the invention, this access may be an access 341b to a memory 310b onboard the sensor processing unit 300b, or an access 352b to an external memory 354b. In the whole description relative to the sensor processing unit 300b, the term "external" means that an element, for example the memory 354b, is located outside the SPU 300b, but may be located within the mobile device 300b.

The SPU 300b further comprises one or more sensors 320b comprising one or more motion sensors 321b, 322b, 323b. According to various embodiments of the invention the one or more sensors 320b may comprise one or more of an accelerometer 321b, a gyro 322b, a magnetometer 323b, a proximity sensor 324b, a light sensor 325b, an image sensor 326b, an audio sensor 327b, a pressure sensor 328b, a temperature sensor 329b, or any other sensor. External sensors may be any of the above mentioned sensors.

The SPU 300b further comprises a processor 330b comprising a processing logic 331b configured to:
  receive signals from said one or more sensors 320b comprising motion signals from said one or more motion sensors;
  identify, based on said signals, a first reference position of the mobile device relative to the user;
  detect, based on said motion signals, a rotation of the mobile device;
  identify, based on said signals, a second reference position of the mobile device relative to the user;
  determine, based at least on said first reference positions and said second reference position, a change of orientation of the mobile device relative to the user during the rotation.

The operation and configuration of the processing logic 331b is further discussed with reference to FIGS. 6a and 6b.

In a number of embodiments of the invention, the processor 330b is further configured to receive signals from external sensors 355b, i.e. sensors which are not located within the SPU 320b. For example, external sensors 355b may be sensors located onboard the mobile device 300b, and comprise non-motion sensors.

In a number of embodiments of the invention, the processor 330b may further comprise a user location processing logic 332b, and output the change of orientation of the mobile device relative to the user to said user location processing logic 332b.

In a number of embodiments of the invention, the mobile device 350b comprises a second processor 353b. This second processor 353b may run all application, operating system, etc. . . In mobile phones or smartphones this processor is often referred to as the host processor or application processor. The processors 330b and 353b may have different characteristics and power. For example, the processor 330b may be less powerful than the processor 353b, but remain active permanently to process signals from said one or more sensors 320b, while the processor 353b is activated only when an application is launched. This In one aspect allows saving power and battery on the mobile device, since the most powerful and energy-consuming processor is less active (e.g. in a sleep mode) than the less powerful and thus less energy-consuming one.

In a number of embodiments of the invention, the SPU 300b comprises a communication interface 340b between the processor 330b, sensors 320b, and memory 310b, and the mobile device 350b comprises another communication interface 351b between the SPU 300b, the processor 353b, the memory 354b and external sensors 355b.

A large number of different embodiments of a SPU 300b, or mobile device 350b are possible. For example, all embodiments of the mobile device 300a may be transposed to the SPU 300b and mobile device 350b.

Figure 4:
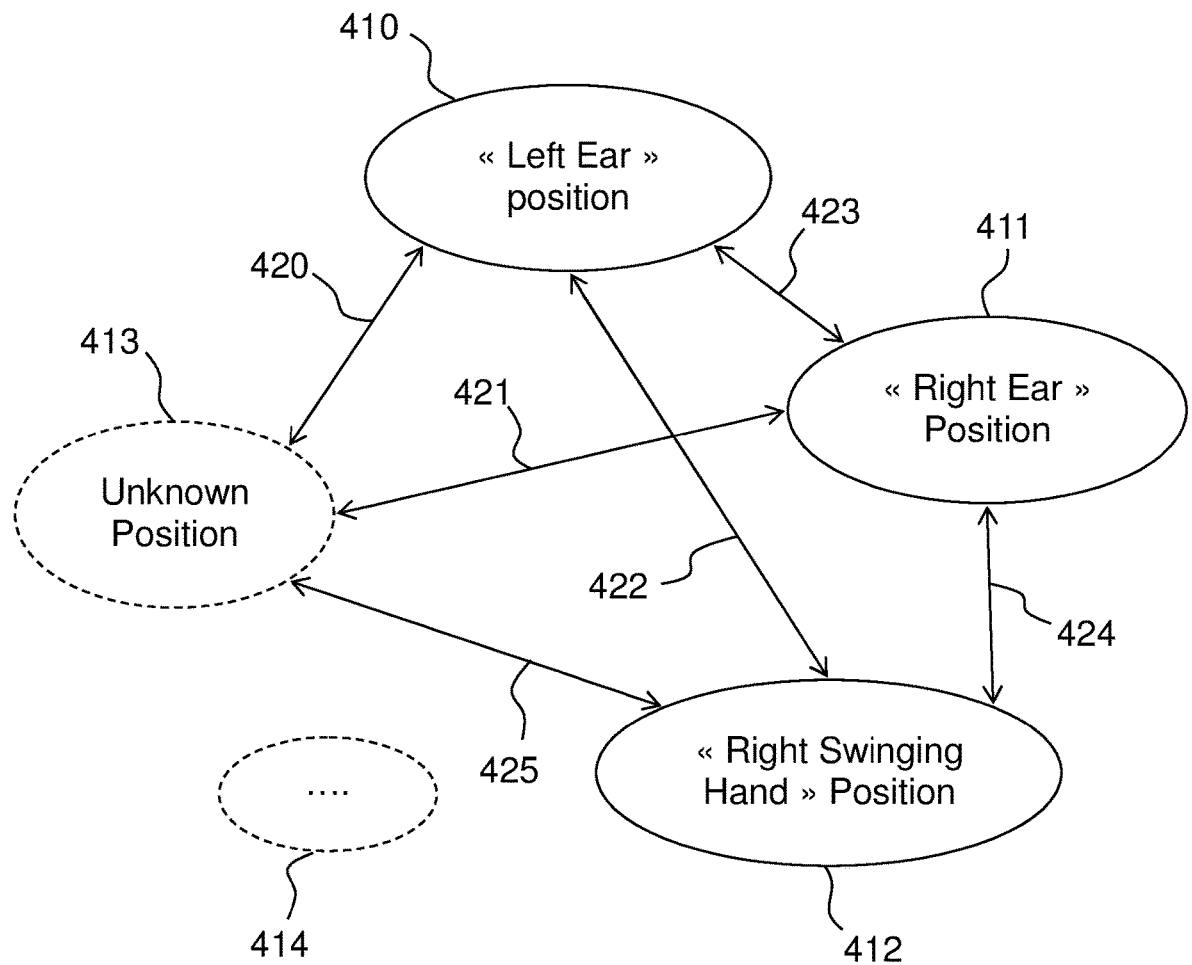
FIG. 4 displays an example of reference positions of a mobile de vice relative to a user in an embodiment of the invention.

FIG. 4 displays an example of reference positions of a mobile device relative to a user in an embodiment of the invention.

In the context of the application, the reference position of the mobile device relative to the user is a relative position which is characterized by a specific use of the mobile device, and shall not be confused with a position defined by x,y,z coordinates. FIG. 4 displays some examples of such reference positions:

A "Left Ear" reference position 410, which is representative of the user holding the mobile device on his or her left ear. This reference position is attained for example if the mobile device is a mobile phone, and the user is performing a phone call with the mobile phone on the left ear;

A "Right Ear" reference position 411, which is representative of the user holding the mobile device on his or her right ear. This reference position is attained for example if the mobile device is a mobile phone, and the user is performing a phone call with the mobile phone on the right ear;

A "Right Swinging Hand" reference position 412, which is representative of the user holding the mobile device in the right hand when walking. Then the mobile device is globally held in a vertical reference position oriented towards the ground, while being affected by a horizontal back-and-forth movement.

It is possible to define as many reference positions as necessary, for a given mobile device. The reference position may reflect the most common positions of a mobile device. For example, the following reference positions may be defined: "right ear", "left ear", "right pocket", "left front pocket", "right front pocket", "left back pocket", "right back pocket", "left landscape", "right landscape", "left swinging hand", "right swinging hand", "portrait". In FIG. 4, all extra positions that may be defined are represented under the reference sign 414. Any regularly used position may be used as a reference position, and may depend on the user or may be adapted to the user.

Some reference positions are static or near-static positions. For example, the "right ear" reference position corresponds to a globally fixed position of the mobile device in front of the right ear of the user. The user may move the phone a small amount in different directions, but the phone remain near the ear. The "right ear", "left ear", "left landscape", "right landscape", and "portrait" reference positions belong to a group of static reference positions. On the other hand, it is also possible in the invention to use dynamic reference positions. For example, the "right pocket", "left front pocket", "right front pocket", "left back pocket", "right back pocket", "left swinging hand" and "right swinging hand" reference positions, are characterized by a globally downwards orientation of the device, along with a horizontal back and forth movement. Thus, although the mobile device moves and is not fixed relative to the user, this position is characterized by specific features. Dynamic reference positions may have repetitive motion patterns which help identify the correct dynamic reference position.

In a number of embodiments of the invention, the reference positions comprise an "unknown" reference position 413, which correspond to a case wherein no other reference position can be detected or identified. In general, it is better to classify a position as an unknown position than misclassifying a position.

The arrows 420, 421, 422, 423, 424 and 425 represent possible transitions between reference positions, respectively between "unknown" reference position and "left ear" reference position, "unknown" reference position and "right ear" reference position, "left ear" reference position and "right swinging hand" reference position, "left ear" reference position and "right ear" reference position, "right ear" reference position and "right swinging hand" reference position, and "right swinging hand" reference position and "unknown" reference position. In the example of FIG. 4, all transitions are possible. In other embodiments of the invention, transitions may be associated with a probability, some transition having a higher probability of occurring than others, because they correspond to a more natural move, or a move often performed by the user. It may also be possible to define certain transitions as impossible.

In the invention, a processing logic, for example the processing logic 331*a* or the processing logic 331*b*, is configured to receive signals from sensors, and identify, based on these signals, a position of the mobile device. According to various embodiments of the invention, the processing logic may be configured to determine the position of the mobile device:

Solely based on signals from one or more sensors 320*a*/320*b* of the mobile device or the SPU;

Based on a combination of signals from one or more sensors 320*a*/320*b* of the mobile device or the SPU, and signals from external sensors such as external sensors 355*b*;

Based on a motion signals from a motion sensors, non-motion signals from a non-motion sensors, or a combination thereof.

In an embodiment of the invention, the processing logic may be configured to execute, at regular interval, a routine to determine the position of the mobile device relative to the user. For example, such determination may be performed every 100 ms, 500 ms, 1 s, or at any other relevant interval. The detection interval may also depend on the position of the mobile device. In other embodiments of the invention, the interval between successive determinations of the position may be variable. For example, the determination of the position may occur only if the quantity of movement of the mobile device, or the rotation speed of the mobile device, is below a detection threshold. The routine to determine the reference position may be triggered by any change of a sensor signal (above a certain threshold). For example, once a first reference position has been determined, the user has to move the device, which will lead some change in the motion signals, before a second reference position can be attained. If the second reference position is a static position, then the motion of the device should be below a certain threshold after the movement that moved the device from the first reference position to the second reference position. If the second reference position is a dynamic position, then a repetitive pattern should be detected. Thus, after motion is detected and has indicated that the first reference position has changed, the processing logic will wait to detect little or no motion to determine a new (quasi) static reference position, or the processing logic will determine if there is a (repetitive) motion pattern that corresponds to a dynamic reference position.

According to various embodiments of the invention, each reference position may be determined by conditions on signals from one or more of the sensors. For example, a "right ear" position can be detected, if the mobile device is kept, for a given time, at a certain orientation or within a predefined orientation range relative to e.g. a terrestrial reference frame. In addition, signals from a proximity sensor may determine that the device is held close to the user, and signals from the microphone may determine that the user is speaking. Moreover, active applications and interactions of the user with the device (or other system information) may provide additional information. For example, is the calling/phoning application active, are the earphone connected, is the user touching the screen etc. If the information from the different sensors and other sources correspond to the same reference position, the confidence factor or index of confidence of the determined reference position increases. The contribution from the different sensors and sources may be given different weights.

In another example, it is possible to use a light sensor to measure the incident light on the mobile device. An absence of incident light is a strong hint that the mobile device is located in a pocket, while a low incident light provides an indication that the mobile device is on the skin or the ear of the user, and a high incident light provides an indication that the mobile device is far from the user.

To determine the reference orientations as accurate as possible it may be useful to use all the sensors. However, using all the sensors all the time may take a lot of power and/or processing resources. The sensor signals that may be used may be predefined, for example by the system determining which sensors are active. Alternatively, the processing logic may be able to control (the settings) of at least some of the sensors. If based on certain sensors signals the reference position cannot be determined (e.g. reference position unknown), or with a too low accuracy, the processing logic may activate additional sensors. For example, based on the orientation derived using motion sensors, the processing logic may not know if the device is close to the right ear, or very far from the right ear. Therefore, the processing logic may activate the proximity sensor to obtain additional data. The activation of additional sensors may be allowed if the obtained confidence factor is too low. In addition, the activation may also depend on the energy mode, wherein in some situations a lower accuracy may be tolerated in favor of resource conservation.

In a number of embodiments of the invention, some reference positions are associated with orientation ranges of the mobile device, which represent the possible orientations or orientation ranges of the mobile device when in this reference position. In a number of embodiments of the invention, a processing logic 331*a* or 332*b* is configured to detect that the mobile device is in a position by identifying, based on motion signals, orientation of the mobile device in a reference frame, for example the reference Frame $F_R$ of FIG. 1, or an horizontal sensor frame. The reference frame may for example be a terrestrial reference frame, or any other fixed reference frame. Then, if the orientation of the mobile device remains in the orientation range for a duration associated with the position, the processing logic 331*a* or 332*b* detects this position as the current position of the mobile device.

This detection can be performed by verifying the value of orientation of the mobile device at a regular interval defined by a sampling rate. In an embodiment of the invention, a reference position is detected if the orientation of the device is in the orientation range for a given number n of successive measurements, or during a given duration. In other embodiments of the invention, the position is detected if the orientation of the mobile device remains within the orientation range most of the time, for example at least for a given number m out of n successive measurements, or in a percentage of measurements above a given threshold for a given duration. This allow detecting a position if the orientation of the device remains in the orientation range, except at few moments wherein a small move of the user made the orientation of the mobile device leave the orientation range. According to various embodiments of the invention, the orientation range may correspond to any means of defining possible angles, in 1, 2 or 3 dimensions.

Dynamic positions, such as the "left swinging hand" and "right swinging hand" reference positions may be determined, not only based on fixed conditions such as an orientation relative to the ground, but also based on dynamic conditions. For example, the "left swinging hand" and "right swinging hand" may be detected if an accelerometer indicates that the mobile device is globally oriented downwards, while measurements from the accelerometer have frequencies representative of a back-and-forth movement of the arm. More generally, a dynamic position can be detected based on a repetitive motion pattern with certain motion characteristics. Characteristics of the dynamic position may be related to frequencies of movement, rotation axis of the movement, amplitude of the movement, etc. There characteristics may be stored in the memory with the reference positions. The values of the characteristics may be predefined, but may also be adapted to the specific user (for example during a learning phase or continuous learning and updating). Some detailed examples of detections of positions are provided, with reference to FIGS. 8*a* to 8*d*.

The detection of many reference positions relies on a comparison of a measurement with reference values associated with the position. In an embodiment of the invention, these reference values are predefined. In other embodiments of the invention, the reference values may be tailored for a user. For example, different users may hold a mobile phone on their right ear with different angles. Thus, if a "right ear" position is identified using angles determined based on accelerometer measurements, the corresponding reference angles may be tailored to reflect the actual orientation range used by the user when it is holding the mobile device in front of its right ear. This may be done, for example, by a machine learning algorithm fed with a historical dataset of accelerometer measurements of the mobile device held by the user. In one embodiment, a reference orientation has a predefined large range so that it works with many different users, but the range is reduced based on machine learning in order to obtain more accurate position and faster reaction when the user changes position.

According to various embodiments of the invention, this may be done in different ways. For example, these measurements may be performed during a training phase, in which the user is successively asked to hold the mobile device in different positions. This may also be done when detecting the reference position, by first determining reference position with large ranges of possible values, then progressively decreasing the range of possible values, based on the actually measured values during reference position detection.

The list above provides a non-limitative example of the reference positions that may be used, as well as sensors to be used to detect a position. In other embodiments of the invention, it is possible to use more or less positions, or define different ones. It is also possible to use different sensors/conditions, based on the sensors available on a given device.

In a number of embodiments of the invention, there may be different conditions to detect a position in the first time, and switching from a position to another. For example, if the detection of the reference position "left ear" is associated with a first range of orientations of the device, it is necessary, in a number of embodiments of the invention, that the orientation of the mobile device leaves a second, larger range of orientations of the device during a predefined duration in order to switch from the "left ear" position to another one. This means that, once a position is detected, it is "harder" to switch to another position than to detect the position. This applies the principle of hysteresis, and increases the stability of the detection of reference position.

The ability of the invention to use signals from different sensor to detect various reference positions of a mobile device relative to a user In one aspect allows discriminating efficiently between different positions. Thus, it allows improving the detection of changes of orientation of the mobile device relative to the user, by using information more complete than the sole information from motion sensors.

Figure 5:
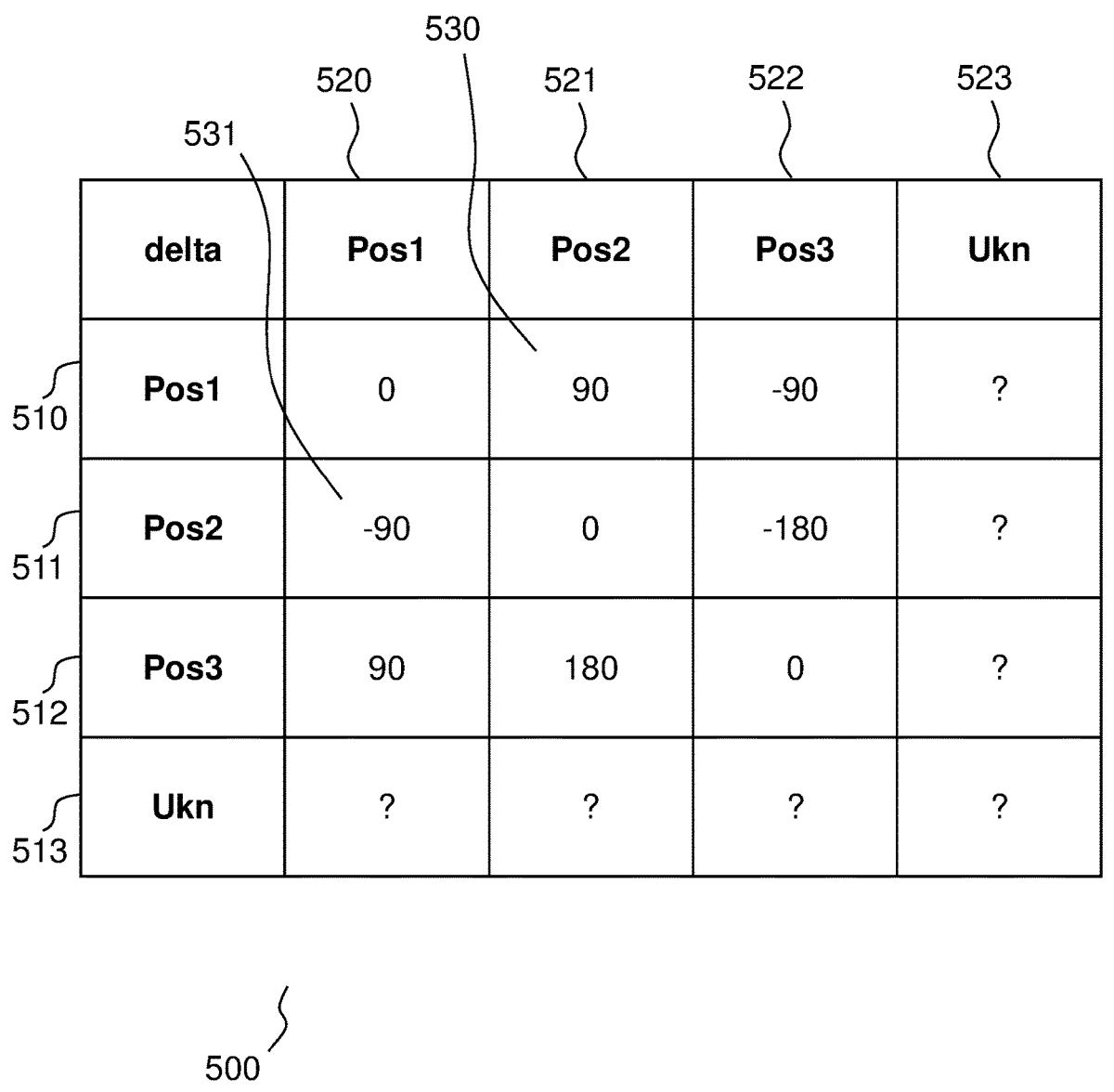

FIG. 5 displays an example of reference changes of orientation of the mobile device in between reference positions.

The table 500 displays reference changes of orientations or transition between a first and a second reference position. For the sake of clarity, positions in the table 500 are abstract position noted "Pos1", "Pos2", "Pos3", and the angles of change are 1D angles. The position "Ukn" refers to an unknown position. However, in different embodiments of the invention, positions may be any of the positions discussed above, or any (user dependent) position to be defined, and angles may be 2D or 3D angles. The reference changes of orientation may for example be stored in the memory 310*a* of the mobile device 300*a*, in the memory 310*b* of the SPU 300*b*, or in the external memory 354*b*. They may be stored in the form of an array, a table, a database, or any relevant form that may be considered relevant by a skilled man.

Each cell provides a reference change of orientation or transition switching from a first reference position to a second reference position. The cells located in the first row 510, the second row 511, the third row 512, and the fourth row 513 respectively correspond to reference changes of orientation wherein the first reference position is the position "Pos1", the position "Pos2", the position "Pos3" and the position "Ukn". Similarly, the cells located in the first column 520, the second column 521, the third column 522 and the fourth column 523 correspond to reference changes of orientation wherein the second reference position is the position "Pos1", the position "Pos2", the position "Pos3" and the position "Ukn". Thus, the cell 530 indicates that the reference change of orientation from the first reference position "Pos1" to the second reference position "Pos2" is +90°. On the other hand, the value in the cell 531 indicates that the opposite change of orientation in between the first reference position "Pos2" and the second reference position "Pos1" is −90°. The table also shows that the cells which correspond to a reference change of orientation between two identical reference positions is always 0°, and that a change of orientation from a first reference position "Ukn" or to a second reference position "Ukn" is an unknown value. Thus, the use of a "Ukn" or "unknown" reference position allows raising an error/flag, or indicating an uncertainty, in cases wherein no transition can be identified with a reasonable certainty. If an unknown reference position is detected, it may also be used to trigger an alternative method to determine a change of orientation of the portable device, for example by calculating the change of orientation based on the motion signals during the movement, as will be discussed in more details in relation to FIGS. 6a and 6b. FIG. 5 shows an example look-up table to store changes of orientation when transitioning between reference positions in memory, but many other methods to store the data are available without modification in the implementation of the proposed methods.

The reference change of orientation represents an estimation of a change of orientation of a mobile device relative to the user when the user moves the mobile device from a first reference position to a second reference position. The knowledge of the position allows providing a good estimation of the change of orientation of the mobile device relative to the user in between the positions. For example, it is possible to obtain a good estimation of the change of orientation of a mobile device when the user moves the mobile device from his/her left ear to his/ear right ear. According to various embodiments of the invention, a skilled man may define the values of changes of orientations in many different ways. For example one or more of the values of the reference changes of orientations may be:

Predefined values of changes of orientations, which are the same for a plurality of users, and correspond to a good estimation of the corresponding change of orientation;

Values of change of orientation which are tailored for a user. The evaluation of the value of the change of orientation may be performed during a training phase, wherein the user is asked to perform the different transitions between positions, in order to measure the effective change of orientation, for this user. The values of reference changes of orientation may also be adapted when using the invention, for example by comparing reference values to values of change of orientation given by motion sensors.

The use of reference values of change of orientation In one aspect allows to get a good estimate of changes of orientation of the mobile device relative to the user, without needing to know the exact orientation of the mobile device relative to the user. This allows using all possible information, in specific contexts wherein reference positions can be defined, and has a number of interesting applications. For example, the inventions allow providing to PDR or other localization engines sudden changes of orientation of the mobile device relative to the user.

In some embodiments, more sophisticated machine learning methods may be used where the reference position and reference changes of orientation are not predefined but are learned and customized for the user. In this case, the system will learn to look for static and dynamic reference positions, which may require a minimum duration, based on reoccurring sensor signals. Learning may be done when many different sensors are available for accurate deduction, and the learned positions may be used when only few sensors are available.

Figure 6A:
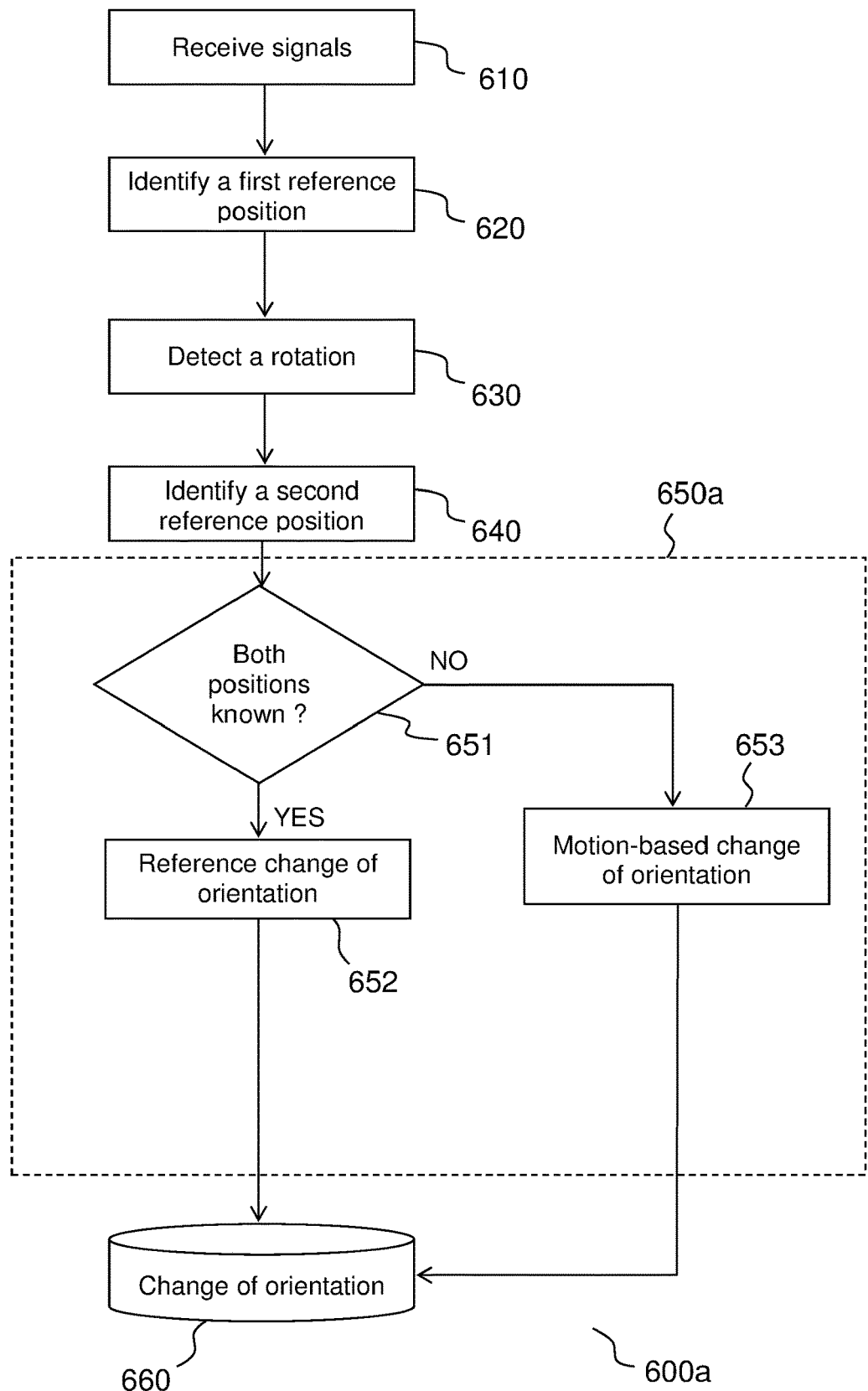
FIGS. 6a and 6b display two examples of configurations of a processing logic in a number of embodiments of the invention.
Figure 6B:
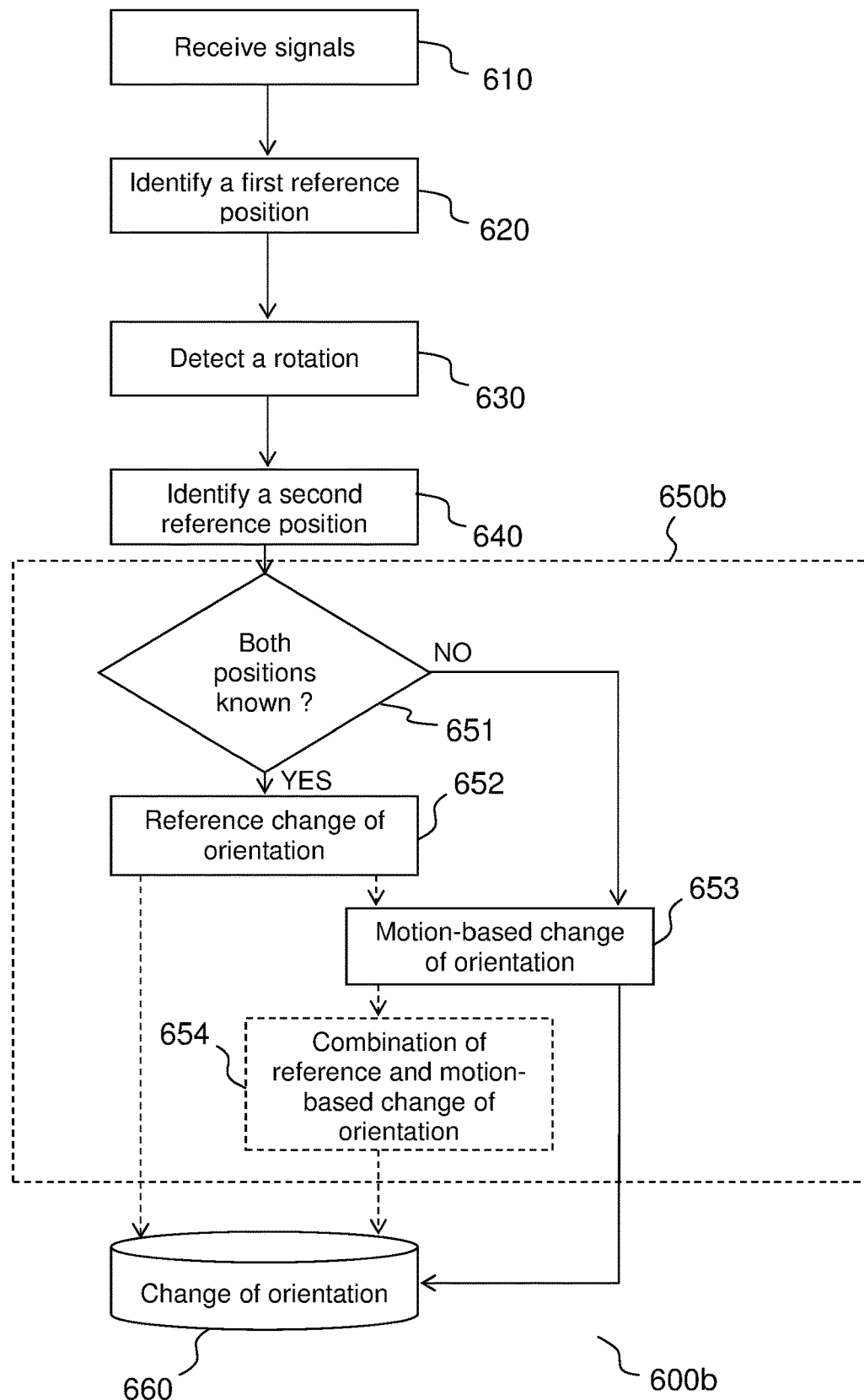

FIGS. 6a and 6b display two examples of configurations of a processing logic in a number of embodiments of the invention.

FIG. 6a displays a first example of a configuration 600a of a processing logic in a number of embodiments of the invention.

The configuration 600a of a processing logic is applicable to one of the processing logic 331a, the processing logic 331b, or any other processing logic in any embodiment of the invention. The configuration 600a can be performed in many different ways, for example by loading code instructions, or through a hardware configuration.

The processing logic is configured to receive 610 signals from said one or more sensors comprising motion signals from said one or more motion sensors. As already discussed with reference to FIGS. 3a and 3b, the invention allows using a wide variety of signals, for example raw or pre-processed signals from sensors 320a, 320b or external sensors 355b.

The processing logic is further configured to identify 620, based on said signals, a first reference position of the mobile device relative to the user. The possible embodiments of detection are discussed with reference to FIG. 4. In a number of embodiments of the invention, the processing logic is configured to periodically identify a current reference position of the mobile device relative to the user. The current reference position when a rotation is detected can thus serve as the first reference position.

The processing logic is further configured to detect 630, based on said motion signals, a rotation of the mobile device. Different embodiments are possible to detect a rotation. When detecting movement of the portable device, it is the rotation within that movement that is of interest, since a rotation may generate a change of orientation of the mobile device relative to the user, while it is not the case with a translation. In some embodiments, the translation and rotation may be determined, while in other only the rotation or translation is determined.

In an embodiment of the invention, the processing logic is configured to detect any movement, which may be either a rotation or a translation. This can be achieved by verifying if a quantity of movement of the device is above a detection threshold for a predefined duration, or more generally if the intensity of motion signals is above a detection threshold. This embodiment is simpler, since any movement, thus any signals from motion sensor, can be detected. However, it detects both rotations and translations, and thus generates a significant number of false positives.

In other embodiments of the invention, the processing logic is configured to detect the rotation based on a signals from a gyrometer. The gyrometer measures the angular speed of the mobile device, and a rotation can be detected, for example if the angular speed measured by a gyrometer is above a detection threshold, during at least a detection duration.

In yet other embodiments of the invention, the processing logic is configured to calculate, based on said motion signals, a rotation speed of the mobile device. This rotation speed can be calculated for example by iteratively calculating an orientation angle of the mobile device, then calculating a derivative between two successive rotation angles. A rotation angle can for example be obtained by signals from a gyroscope, an accelerometer, or a fusion of signals from a gyroscope and an accelerometer. In a number of embodiments of the invention, the processing logic is configured to detect a rotation if the rotation speed is above a first threshold of rotation speed for a first predefined duration.

In other embodiments of the invention, the processing logic is configured to calculate a change of orientation of the sensors and thus the portable device in a fixed reference frame, and detect a motion/rotation when the change of orientation is above a detection threshold, without calculating a rotation speed. The change of orientation may be calculated for example by successive time steps, or compared to the orientation of the device at the end of the previous rotation or previously determined reference position.

More generally, a skilled man easily identifies a relevant method to detect a rotation, based on the available sensors.

The processing logic is further configured to identify 640, based on said signals, a second reference position of the mobile device relative to the user.

The identification of the second reference position may occur when the processing logic detects that the rotation is terminated. The processing logic can for example detect that the rotation is terminated, if a rotation speed falls below a second threshold of rotation speed for a second duration. More generally, all embodiments of detection of the rotation/motion can be adapted to detect that the rotation/motion is over and that a new (quasi) static position is obtained. In other embodiments, embodiments, the detection of the end of rotation may be adapted to cover cases wherein the second reference position is a dynamic position such as the "swinging hand" position, wherein the back-and-forth movement generates a continuous, even though within a limited range, rotation. In such case, the end of the rotation may be detected for example if the orientation of the mobile device in a fixed reference frame oscillates around a median value. The end of the movement may also be determined when another predetermined repetitive motion pattern is detected, such as "swinging in hand".

In a number of embodiments of the invention, the identification 640 of the second reference position may be identical to the identification 620 of the first reference position.

In other embodiments of the invention, the identification 640 of the second reference position may follow the same rules the identification 620 of the first reference position, but using different thresholds or limit values. For example, in an embodiment of the invention, the "left ear" position is detected if the orientation of the mobile device remains within an orientation range for a predefined duration. The orientation range and/or the predefined duration may be different for identifying 620 the first reference position, and for identifying 640 the second reference position, i.e they may be different for identifying a reference position in the general case, prior to the detection of a rotation, and for detecting a reference position immediately after a rotation, which will serve as a second reference position. This may be useful, for example to detect the second reference position in a shorter duration, and thus determine the change of orientation of the mobile device as quickly as possible after the end of the rotation.

The processing logic is further configured to determine 650a, based at least on said first reference position and said second reference position, a change of orientation 660 of the mobile device relative to the user during the rotation.

According to various embodiments of the invention, the determination of the change of orientation can be performed in many different ways. In embodiments wherein one of the first or the second position can be an "unknown" position for which a reference change of orientation cannot be found, the processing logic is configured to verify 651 if one of the first or the second reference orientation is an "unknown" orientation.

In cases wherein the first and the second reference orientations are both a known orientation, the change of orientation 660 is based 652 on a corresponding reference change of orientation in between the first reference orientation and the second reference orientation. The determination of the reference change of orientation is explained with reference to FIG. 4. In a number of embodiments of the invention, the change of orientation 660 is then equal to the reference change of orientation in between the first reference orientation and the second reference orientation. The reference change of orientation may then be provided to the user location processing logic (e.g. a fused location provider) to determine the location of the user.

In cases where both reference positions are not known, the reference change of orientation cannot be determined by the method explained above. In some embodiments this means that the processing logic may not be able to provide a reference change of orientation to the user location processing logic. In other embodiments of the invention, an alternative method to determine the change of orientation may be used when the reference change of orientation cannot be determined. This has the advantages of providing a change of orientation to the user location processing logic at all time. For example, the processing logic may be further configured to calculate 653 a motion-based change of orientation of the mobile device relative to the user based on motion signals. For example, this may consist in calculating, based on signals from an accelerometer, a gyro or a combination thereof, a change of orientation of the mobile device during the rotation. Such signals usually allow calculating the change of orientation of the mobile device in a fixed frame of reference, such as the frame $F_R$. Methods to determine a change of orientation based on accelerometer and/or gyrometer data are widely covered in the prior art and known to the person skilled in the art. It is possible, making the assumption that the user performed only a limited rotation on itself (i.e. user does not move or moves in a straight line), to approximate a change of orientation of the mobile device in a fixed frame of reference as a change of orientation of the mobile device relative to the user.

FIG. 6b displays a second example of a configuration 600b of a processing logic in a number of embodiments of the invention In the example configuration 600a, the processing logic either uses the reference change of orientation or the motion-based change of orientation. The configuration 600b is very similar to configuration 600a, although an extra step is added where, if the reference change of orientation and the motion-based change of orientation are both available, both configurations are combined to determine a final change of orientation. Similarly, to the configuration 600a, the configuration 600b may be embedded in a processing logic of the invention, such as the processing logic 331a or the processing logic 331b.

In configuration 600b, the steps 652 and 653 to determine the reference and motion-based change of orientation, respectively, are identical to configuration 600a. However, if both changes of orientation are present, they are combined in step 654 to obtain a final combined change of orientation.

For example, the processing logic can be configured to calculate the change of orientation 660 of the mobile device relative to the user as a weighted sum of the reference change of orientation 652 of the mobile device relative to the user and the motion-based change of orientation 653 of the mobile device relative to the user.

Different ways are possible to calculate the weights of the weighted sum. For example, the processing logic can be configured to calculate a preliminary index of confidence of the reference change of orientation of the mobile device relative to the user, and calculate the weights of the weighted sum based on this preliminary index of confidence. The preliminary index of confidence may be based on the calculation to determine the reference positions based on the sensor signals. For example, it may provide more weight to the reference change of orientation of the mobile device relative to the user if has a high preliminary index of confidence than if it has a low preliminary index of confidence. Similarly, based on the motion signals during the movement from the first reference position to the second reference position, the processing logic may determine a preliminary index of confidence for the motion-based change of orientation. For example, for smooth motion, e.g. without much proper acceleration, the orientation change can be determined with a larger confidence that if proper acceleration is present that influences the accelerometer signals.

According to various embodiments of the invention, the preliminary index of confidence for the reference change of orientation may be calculated based one or more (or combination) of the following elements:

- Each position can be determined with an index of confidence. The index of confidence may be associated to the position itself. For example, it can be known that the position "left ear" is detected with a higher confidence than the position "portrait";
- An index of a confidence of a position can depend on the number of sensors that were involved in the detection of the position, and the signals from these sensors. For example, a "left ear" position can be detected with a high confidence if the microphone captured the sound of the voice of the user, while the accelerometer indicated that the angle of orientation of the mobile device is in the orientation range of the left ear, and with a low confidence if it is detected using an angle measured by the accelerometer only. The confidence of detecting such position may also be increased by using a proximity sensor. In some embodiments of the invention, the proximity sensor is not always active, and can be activated on demand when the confidence of detection of a position is low, in order to confirm the position, with higher confidence, or invalid position detection and switch to an "unknown" position;
- The preliminary index of confidence can be calculated based on an index of confidence of the first position, and an index of confidence of the second reference position. For example, it can be calculated as an average of the two reference positions;
- The preliminary index of confidence may also depend on the transition performed. For example, a transition between a "left ear" reference position and a "right ear" reference position can be considered as a very likely transition and thus have a good index of confidence, while a transition between a "right front pocket" reference position and a "left back pocket" reference position may be considered less likely, and thus have a lower preliminary index of confidence. This may be based on a probability of occurrence of transitions.

In some embodiments, the processing logic may be configured, if at least one of the first and the second position is an unknown position, not to detect 661 any change of orientation of the device.

In a number of embodiments of the invention, if one of the first reference position and the second reference position is an unknown position, the processing logic is configured to calculate the change of orientation 660 only as a motion-based change of orientation 653. In other embodiments of the invention, the processing logic is also configured to calculate the change of orientation 660 as a motion-based change of orientation 653, if a transition between the first reference position and the second reference position is considered as unlikely, or has a low index of confidence. For example, if a transition between a "right front pocket" reference position and a "left back pocket" reference position is considered as a too unnatural and unlikely move and has a low index of confidence, the processing logic can be configured to calculate only a motion-based change of orientation, rather than taking into account a reference change of orientation in between the "right front pocket" reference position and the "left back pocket" reference position.

The calculation of the motion-based change of orientation is similar to the calculation of a motion-based change of orientation discussed above, and is based on the motion signals only, making the assumption that the user did not move, or walked in straight line, during the rotation of the mobile device. Despite this approximation, this allows obtaining in any case a change of orientation.

In a number of embodiments of the invention, the change of orientation 660 is associated with an index of confidence. The index of confidence allows evaluating the use of the determined change of orientation 660 for future use. For example, a user location processing logic 332a or 332b may be configured to use as input only the changes of orientation associated with a high index of confidence. According to various embodiments of the invention, the index of confidence can be calculated in different ways.

For example, a change of orientation for which at least one of the first or the second reference position is an "unknown" position may have a low index of confidence. More generally, a change of orientation determined solely on motion signals may have a lower index of confidence than a change of orientation calculated based on a reference change of orientation. On the other hand, the index of confidence of a change of orientation which is based on both a reference change of orientation and a motion-based change of orientation may depend on the correlation between the reference change of orientation and the motion-based change of orientation. For example, if the motion-based change of orientation and the reference change of orientation have very close values, the resulting change of orientation 660 may have a good index of confidence. The index of confidence of the change of orientation 660 may also be based on the preliminary index of confidence of the reference and motion-based change of orientation, if such preliminary index has been determined. The processing logic may send the determined final change of orientation and the index of confidence to the user location processing logic which then decides how to use the data based on the confidence factor. Alternatively, the processing logic may send the determined final change of orientation (and the index of confidence) to the user location processing logic only when the confidence is above a certain threshold.

Figure 7:
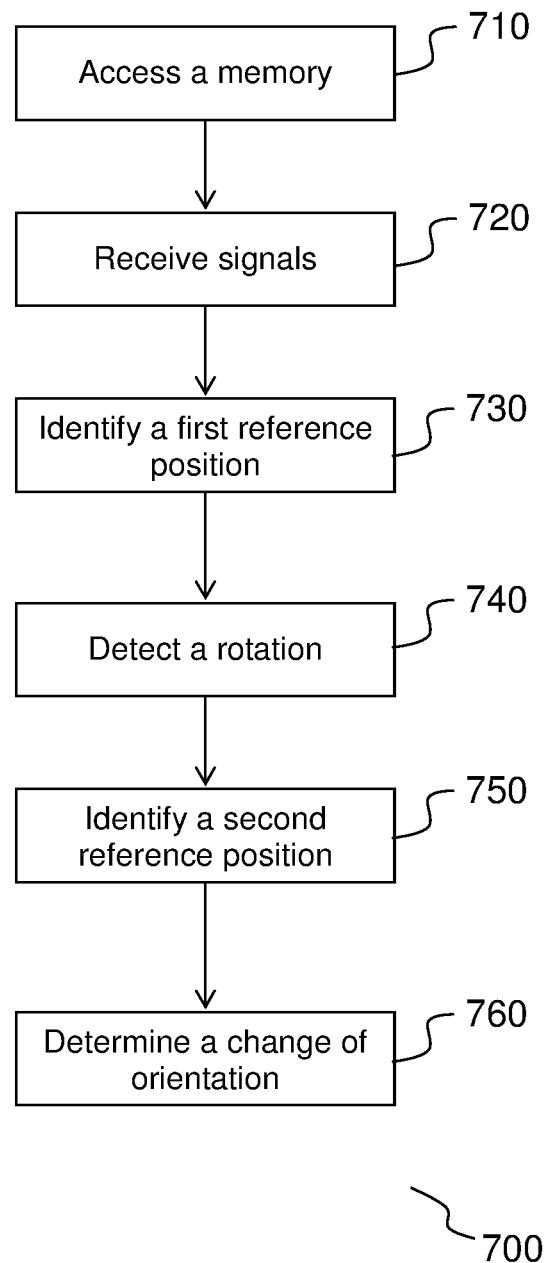
FIG. 7 displays a method for determining a change of orientation of a mobile device relative to a user, in a number of embodiments of the invention.

FIG. 7 displays a method for determining a change of orientation of a mobile device relative to a user, in a number of embodiments of the invention.

The method 700 comprises a first step 710 of accessing a memory storing two or more reference positions of the mobile device relative to the user, and one or more reference changes of orientation of the mobile device relative to the user in between the two or more reference positions.

The method 700 further comprises a second step 720 of receiving signals from said one or more sensors comprising motion signals from at least one motion sensor onboard the mobile device.

The method 700 further comprises a third step 730 of identifying, based on said signals, a first reference position of the mobile device relative to the user. Information on the characteristics of the reference position may be stored in the memory, which may include instruction on how to determine the reference position with one or more sensors.

The method 700 further comprises a fourth step 740 of detecting, a rotation (or other motion) based on motion signals.

The method 700 further comprises a fifth step 750 of identifying, based on said signals, a second reference position of the mobile device relative to the user, after the end of the detected rotation/motion.

The method 700 further comprises a sixth step 760 of determining, based at least on said first reference position and said second reference position, a change of orientation of the mobile device relative to the user during the rotation.

The method 700 may for example be implemented in a processing logic 331a or 331b. All embodiments described above can be adapted to the method 700. If one of the first or the second position is an "unknown" position, the change of orientation may be determined solely based on motion signals, rather than based on reference changes of orientation. If the first position is an "unknown" position, a motion-based change of orientation can be determined immediately at the end of the rotation, without needing to have already detected the second reference position, in order to have a value of the change of orientation earlier. However the second reference position can be detected in parallel, and may serve as a basis for detecting future changes of orientation.

FIGS. 8a, 8b, 8c and 8d display respectively a possible reference for calculating rotations of a mobile for detecting positions of the mobile device, and 3 logics for detecting 3 positions, in a number of embodiments of the invention.

Figure 8A:
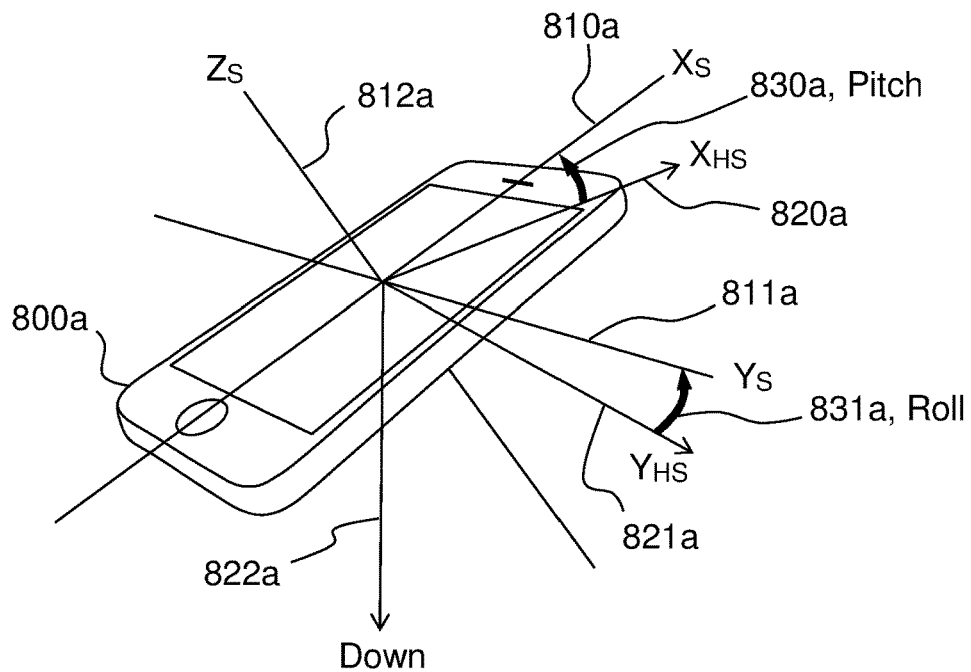
FIGS. 8a, 8b, 8c and 8d display respectively a possible reference for calculating rotations of a mobile for detecting positions of the mobile device, and 3 logics for detecting 3 positions, in a number of embodiments of the invention.

FIG. 8a displays a possible reference for calculating rotations of a mobile device for detecting positions of the mobile device. This reference is provided by means of example only, and other references may be used in different embodiments of the invention, for detecting the rotation of the mobile device. The mobile device 800a is a mobile device of the invention, for example the mobile device 300a or a mobile device comprising a SPU 800b. The sensor frame, which is tied to the motion sensors within the mobile device, comprises the axes Xs 810a, Ys 811a, and Zs 812a. A horizontal sensor frame is obtained comprising three axes $X_{HS}$ 820a, $Y_{HS}$ 821a, and $Z_{HS}$ 822a is obtained by setting the axis $Z_{HS}$ 822a as a vertical one, and axes $X_{HS}$ 820a and $Y_{HS}$ 821a as horizontal axes, which correspond to a projection of the axis Xs 810a and Ys 811a on a horizontal plane, such as the x-y plane of the trajectory frame or terrestrial/gravity frame. The calculation of a rotation matrix of the mobile device is a well known topic for person skilled in the art, and is for example discussed in detail in co-pending, commonly owned U.S. patent application Ser. No. 14/537,503 filed Nov. 10, 2014, which is hereby incorporated herein by reference in its entirety. The pitch angle 830a is the angle between axes $X_{HS}$ 820a, and Xs 810a around axis $Y_{HS}$ 821a, while the roll angle 831a is the rotation angle between axes $Y_{HS}$ 821a, and Ys 811a around axis Xs 810a. Thus, the pitch angle is representative of the mobile device being more horizontal or more vertical, while the roll angle is representative being turned around its longitudinal axis Xs 810a.

Figure 8B:
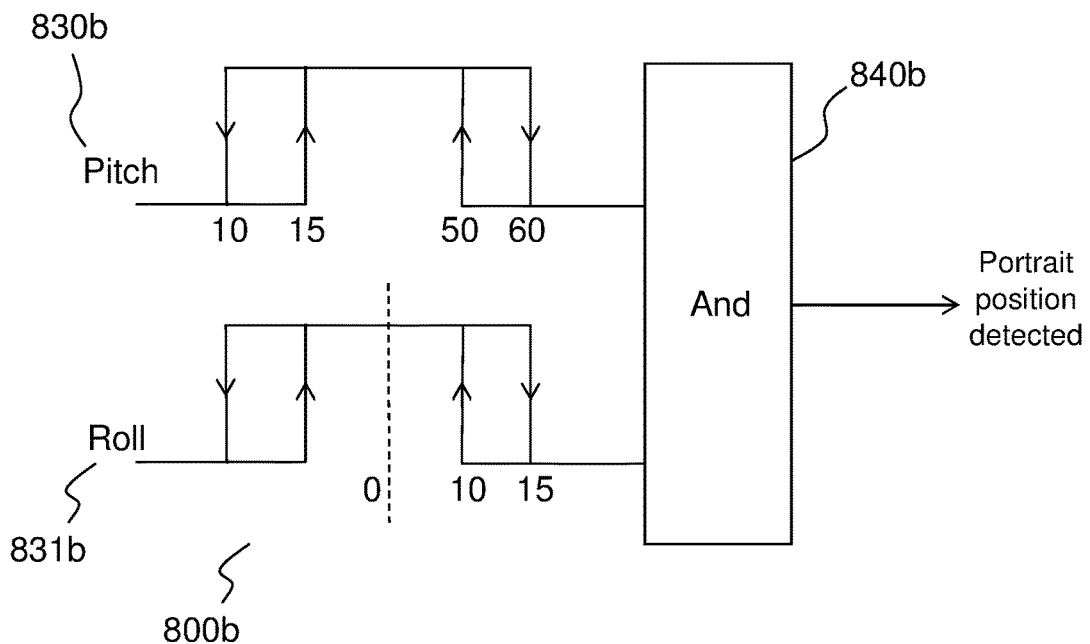

FIG. 8b displays an example logic 800b for detecting a "portrait" position of the mobile device 800a.

The logic 800b is based on a condition 830b on pitch angle values, and a condition 831b on roll angle values. Regarding pitch, the upward arrows means that, when detecting the switch to a "portrait" position the pitch condition 830b is satisfied if the pitch angle 830a has a value between 15 and 50°. The downwards arrows means that, when the current position of the mobile device is the "portrait" position, the pitch angles value need to be below 10°, or above 60°, for the pitch condition 830b to be dissatisfied and another position to be selected. In other word the range to activate the portrait position is different, smaller, than the range to exit the portrait position.

Similarly, the roll condition 831b is satisfied, when detecting the switch to a "portrait" position, if the value of the roll angle 830 is between −10° and 10°, and, when the current position is the "portrait" position, the roll condition 831b is dissatisfied when the value of the roll angle is above 15° or below −15°. The "and" operator 840b means that the portrait position is detected when both the pitch condition 830b, and the roll condition 831b are satisfied.

This means that a "portrait" position is detected, if the pitch angle remains between 15° and 60°, and the roll angle remains between −10° and 10° for a predefined duration, and the another position can be detected, if the pitch angles goes above 60°, below 10°, or of the roll angle goes above 15°, or below −15°. It can be noted that the use of larger limit angles for leaving a position than for switching to a position enhances the stability of the detection, by providing an additional margin for leaving a position, if the user performs short, unintentional moves around a position, for example tremors.

Meanwhile, it can also be noted that the pitch condition angle is centered on an angle of 32.5°. This angle corresponds to experimental results of a large number of user, and appeared to be the average pitch angle when users were holding a mobile phone in a "portrait" position. However, this value, as well as the different detection threshold, may have different value, such as values tailored for a user during a training phase, adaptive values, or different predefined values.

The logic 800b is provided by means of example only of a logic for detecting "portrait" positions. However, in different embodiments of the invention, other logics may be defined, and a skilled man may easily define the best suited logics according to his needs.

Figure 8C:
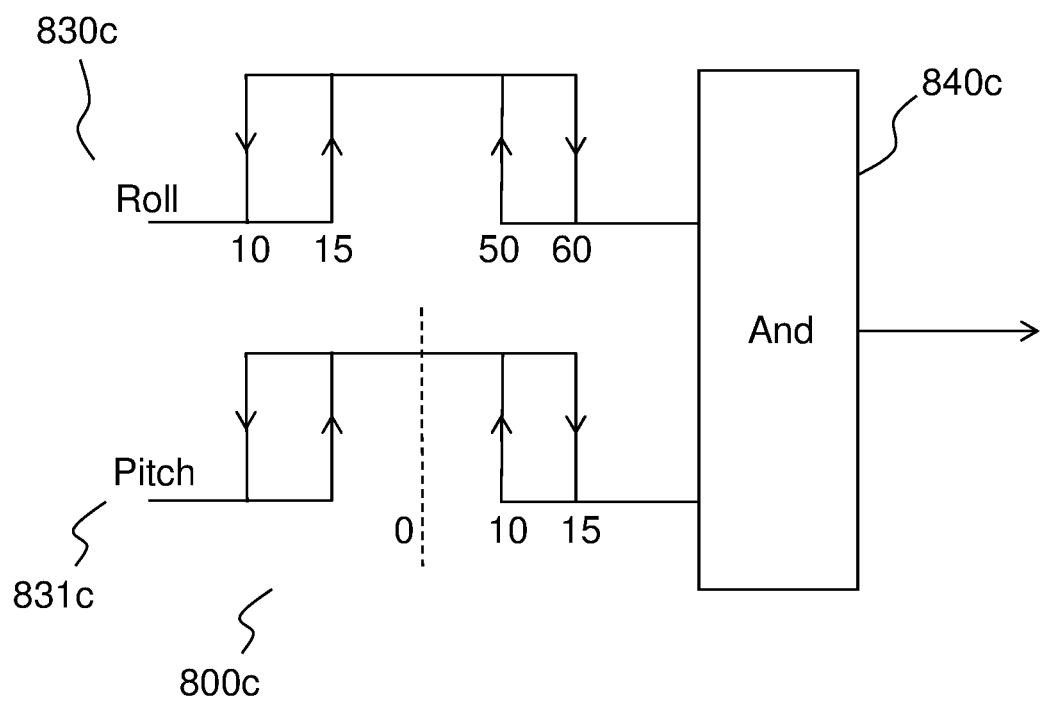

FIG. 8c displays an example logic 800c for detecting a "landscape" position of the mobile device 800a.

The logic 800c is similar to the logic 800b, with a roll condition 830c, a pitch condition 831c, and an "and" operator 840c. In the logic 800c, the roll condition is satisfied if the roll angle is between 15° and 50° for switching to the "landscape" position, and dissatisfied of the roll angle is below 10° or above 60°, for leaving the "landscape" position. In the logic 800c, the pitch condition is satisfied if the pitch angle is between −10° and 10° for switching to the "landscape" position, and dissatisfied of the roll angle is below −15° or above 15°, for leaving the "landscape" position.

Figure 8D:
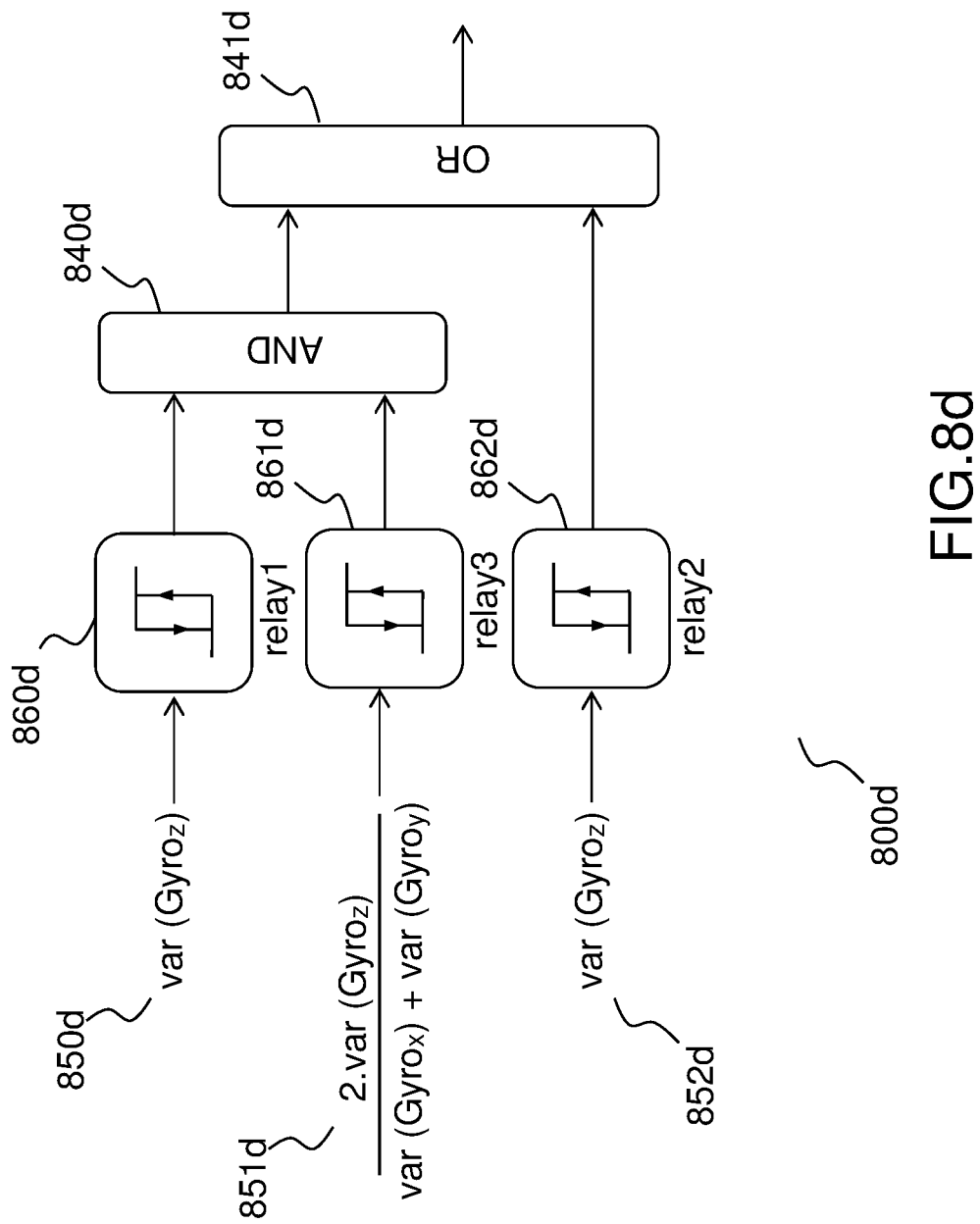

FIG. 8d displays an example logic 800d for detecting a "swinging hand" position of the mobile device 800a.

The logic 800d comprises a first condition 850d on the variance of z measurements of the gyrometer, a second condition 851d on a combination of x,y, and z variances of the gyrometer, and a third condition 853d on the variance of the z gyrometer. The variance of gyro measurements on an axis represents an indication of a quantity of motion on this axis.

The first condition 850d is verified when a first "relay" function 860d is verified. The "relay" function is verified if the variance of the gyro measurements on the z axis (i.e the vertical axis 822a) is above a threshold, and stop being verified if the variance of the gyro measurements on the z axis falls below a second, lower threshold. The variance of the gyro measurements on the vertical axis can be seen as a good hint of swinging hand movement, since a continuous vertical quantity of motion have a good chance of being generated by back-and-forth movement of a swinging hand. The z-axis represents the axis of rotation of the swinging action as detected by the z-gyroscope. The typical characteristics of the swinging motion may be adapted to the user, which may include using different axes.

The third condition 852d is similar to the first condition 850d, with a third "relay" function 862d on variance of gyro measurements on z axis. However the third relay functions have different, higher thresholds than those of the first "relay" function 860d. These different thresholds are used to detect slightly different swinging in hand patterns.

The second condition 851d is based on a ratio of twice the variance of gyro measurements on z axis on a sum of the variance of gyro measurements on x and y axes (respectively axes 820a and 821a). This ratio basically represents a ratio between the quantities of motion of the mobile device on the vertical axis and the horizontal axes. This verifies that the motion is along a certain predefined axes, in this case the z-axis.

The logic 800d comprises an "and" operator 840d on the conditions 850d and 851d, and a "or" operator 841d between the output of the operator 840d, and the condition 852d. This means that the output of the "or" operator 841d is positive if:

The quantity of movement on the vertical axis is above a first threshold (condition 850d), and the quantity of movement on the vertical axis is significantly superior to quantities of movement on the horizontal axes (condition 851d)

Or the quantity of movement on the vertical axis is above a second, higher threshold (condition 852d).

In a number of embodiments of the invention, the "swinging hand" position is detected if the output of "or" operator 841d is positive. In other embodiments of the invention, an delay operator can be added at the output of the "or" operator 841d, so that the "swinging hand" position is detected, only if the output of the "or" operator 841d remains positive for a predefined duration.

The logics 800b, 800c, 800d above are provided by means of examples only, and a skilled man may create the relevant logics for detecting any position.

In one aspect, the processor is configured to detect one or more of the first reference position and the second reference position based on said motion signals.

In one aspect, the mobile device comprises one or more non-motion sensors, wherein the processor is configured to detect at least one of the first reference position and the second reference position based on signals from said one or more non-motion sensors.

In one aspect, said one or more non-motion sensors comprise one or more of a proximity sensor, a light sensor, an image sensor, an audio sensor, a pressure sensor, and a temperature sensor.

In one aspect, the processor is configured to iteratively calculate, based on said motion signals, a rotation speed of the mobile device.

In one aspect, the processor is configured to detect the rotation of the mobile device if the rotation speed of the mobile device is above a first threshold of rotation speed for at least a first predefined duration.

In one aspect, at least one of the first reference position and the second reference position is a static position.

In one aspect, at least one of the first reference position and the second reference position is a dynamic position.

In one aspect, the dynamic position is detected based on a repetitive motion pattern.

In one aspect, the processor is configured to detect, based on said motion signals, a reference position of the mobile device, said reference position being associated with one or more orientation ranges and a duration, by: identifying, based on said motion signals, orientations of the mobile device in a fixed reference frame; if said orientation remain within said one or more orientation ranges for said duration, identify the reference position.

In one aspect, the processor is configured to calculate an index of confidence of the change of orientation.

In one aspect, the processor is configured to calculate said change of orientation of the mobile device relative to the user during the rotation based on a reference change of orientation of the mobile device relative to the user in between the first reference position and the second reference position.

In one aspect, the processor is further configured to calculate a motion-based change of orientation of the mobile device relative to the user based only on said motion signals during the movement, and to calculate the change of orientation of the mobile device relative to the user based on a combination of said reference change of orientation of the mobile device relative to the user and said motion-based change of orientation of the mobile device relative to the user.

In one aspect, the processor is configured to calculate said change of orientation of the mobile device relative to the user as a weighted average of said reference change of orientation of the mobile device relative to the user and said motion-based change of orientation of the mobile device relative to the user.

In one aspect, the processor is configured to: calculate a preliminary index of confidence of the reference change of orientation of the mobile device relative to the user; calculate, based on said preliminary index of confidence, weights of the weighted sum, and said index of confidence of the change of orientation of the mobile device relative to the user.

In one aspect, the processor is configured, if at least one of the first reference position or the second reference position is an unknown position, to calculate the change of orientation of the device relative to the user as a motion-based change of orientation of the mobile device relative to the user based on said motion signals during the rotation.

In one aspect, the mobile device comprises an accelerometer and a gyroscope, wherein said motion signals comprise an orientation of the mobile device based on a fusion of signals from the accelerometer and the gyroscope.

In one aspect, the processor further comprises a user location processing logic to calculate a location of the user based on a fusion of data from different sensors, wherein the processor is configured to output the change of orientation to said user location processing logic.

As described above, the disclosure also includes a sensor processing unit for integration in a mobile device, comprising: an access to a memory storing two or more reference positions of the mobile device relative to a user, and one or more reference changes of orientation of the mobile device relative to the user in between the two or more reference positions; one or more sensors comprising one or more motion sensors; a processor comprising a processing logic configured to: receive signals from said one or more sensors comprising motion signals from said one or more motion sensors; identify, based on said signals, a first reference position of the mobile device relative to the user; detect, based on said motion signals, a rotation of the mobile device; identify, based on said signals, a second reference position of the mobile device relative to the user; determine, based at least on said first reference positions and said second reference position, a change of orientation of the mobile device relative to the user during the rotation.

In one aspect, said memory is located onboard the sensor processing unit.

In one aspect, the processor is further configured to receive signals from external sensors.

In one aspect, one or more external sensors are non-motion sensor.

The examples described above are given as illustrations of embodiments of the invention. They do not in any way limit the scope of the invention which is defined by the following claims.

The invention claimed is:

1. A mobile device, comprising:
   a) a memory of the portable device storing two or more reference positions of the mobile device relative to a specific location of a user, and one or more reference changes of orientation of the mobile device relative to the user in between the two or more reference positions, wherein each reference change of orientation is associated with a predetermined amount of orientation change;
   b) one or more sensors of the portable device comprising one or more motion sensors;
   c) a processor of the portable device comprising a processing logic configured to:
      i) receive signals from said one or more sensors comprising motion signals from said one or more motion sensors;
      ii) identify, based on said signals, a first reference position of the mobile device relative to the user;
      iii) detect, based on said motion signals, a rotation of the mobile device;
      iv) identify, based on said signals, a second reference positioning of the mobile device relative to the user;
      v) quantify, based at least on the reference change of orientation corresponding to a transition from said first reference position to said second reference position, a change of orientation of the mobile device relative to the user during the rotation.

2. The mobile device of claim 1, wherein the processor is configured to detect one or more of the first reference position and the second reference position based on said motion signals.

3. The mobile device of claim 1, comprising two or more sensors comprising one or more non-motion sensors, wherein the processor is configured to detect at least one of the first reference position and the second reference position based on signals from said one or more non-motion sensors.

4. The mobile device of claim 3, wherein said one or more non-motion sensors comprise one or more of a proximity sensor, a light sensor, an image sensor, an audio sensor, a pressure sensor, and a temperature sensor.

5. The mobile device of claim 1, wherein the processor is configured to iteratively calculate, based on said motion signals, a rotation speed of the mobile device.

6. The mobile device of claim 5, wherein the processor is configured to detect the rotation of the mobile device if the rotation speed of the mobile device is above a first threshold of rotation speed for at least a first predefined duration.

7. The mobile device of claim 1, wherein at least one of the first reference position and the second reference position is a static position.

8. The mobile device of claim 1, wherein at least one of the first reference position and the second reference position is a dynamic position.

9. The mobile device of claim 8, wherein the dynamic position is detected based on a repetitive motion pattern.

10. The mobile device of claim 1, wherein the processor is configured to detect, based on said motion signals, a reference position of the mobile device, said reference position being associated with one or more orientation ranges and a duration, by a) identifying, based on said motion signals, orientations of the mobile device in a fixed reference frame; b) if said orientation remains within said one or more orientation ranges for said duration, identifying the reference position.

11. The mobile device of claim 1, wherein the processor is configured to calculate an index of confidence of the change of orientation.

12. The mobile device of claim 1, wherein the processor is configured to calculate said change of orientation of the mobile device relative to the user during the rotation based on a reference change of orientation of the mobile device relative to the user in between the first reference position and the second reference position.

13. The mobile device of claim 12, wherein the processor is further configured to calculate a motion-based change of orientation of the mobile device relative to the user based only on said motion signals during the movement, and to calculate the change of orientation of the mobile device relative to the user based on a combination of said reference change of orientation of the mobile device relative to the user and said motion-based change of orientation of the mobile device relative to the user.

14. The mobile device of claim 13, wherein the processor is configured to calculate said change of orientation of the mobile device relative to the user as a weighted average of said reference change of orientation of the mobile device relative to the user and said motion-based change of orientation of the mobile device relative to the user.

15. The mobile device of claim 14, wherein the processor is configured to:
   a) calculate a preliminary index of confidence of the reference change of orientation of the mobile device relative to the user;
   b) calculate, based on said preliminary index of confidence, weights of the weighted sum, and said index of confidence of the change of orientation of the mobile device relative to the user.

16. The mobile device of claim 1, wherein the processor is configured, if at least one of the first reference position or the second reference position is an unknown position, to calculate the change of orientation of the device relative to the user as a motion-based change of orientation of the mobile device relative to the user based on said motion signals during the rotation.

17. The mobile device of claim 1, comprising an accelerometer and a gyroscope, wherein said motion signals comprise an orientation of the mobile device based on a fusion of signals from the accelerometer and the gyroscope.

18. The mobile device of claim 1, the processor further comprising a user location processing logic to calculate a location of the user based on a fusion of data from different sensors, wherein the processor is configured to output the change of orientation to said user location processing logic.

19. A sensor processing unit for integration in a mobile device, comprising:
   a) an access to a memory storing two or more reference positions of the mobile device relative to a specific location of a user, and one or more reference changes of orientation of the mobile device relative to the user in between the two or more reference positions, wherein each reference change of orientation is associated with a predetermined amount of orientation change;
   b) one or more sensors of the sensor processing unit comprising one or more motion sensors;
   c) a processor of the sensor processing unit comprising a processing logic configured to:
      i) receive signals from said one or more sensors comprising motion signals from said one or more motion sensors;
      ii) identify, based on said signals, a first reference position of the mobile device relative to the user;
      iii) detect, based on said motion signals, a rotation of the mobile device;
      iv) identify, based on said signals, a second reference position of the mobile device relative to the user;
      v) determine, based at least on the reference change of orientation corresponding to a transition from said first reference positions to said second reference position, a change of orientation of the mobile device relative to the user during the rotation.

20. The sensor processor unit of claim 19, wherein said memory is located onboard the sensor processing unit.

21. The sensor processor unit of claim 19, wherein the processor is further configured to receive signals from external sensors.

22. The sensor processor unit of claim 21, wherein one or more external sensors are non-motion sensors.

23. A method for determining a change of orientation of a mobile device relative to a user, said method comprising:
   a) accessing a memory of the mobile device storing two or more reference positions of the mobile device relative to a specific location of the user, and one or more reference changes of orientation of the mobile device relative to the user in between the two or more reference positions, wherein each reference change of orientation is associated with a predetermined amount of orientation change;
   b) receiving signals from said one or more sensors of the mobile device comprising motion signals from at least one motion sensor onboard the mobile device;
   c) detecting, based on said signals, a first reference position of the mobile device relative to the user;
   d) identifying, based on said signals, a first reference position of the mobile device relative to the user;
   e) detecting, based on said motion signals, a rotation of the mobile device;
   f) identifying, based on said signals, a second reference position of the mobile device relative to the user;
   g) determining, based at least on the reference change of orientation corresponding to a transition from said first reference position to said second reference position, a change of orientation of the mobile device relative to the user during the rotation.

* * * * *